United States Patent
Kendall et al.

(10) Patent No.: US 11,845,236 B2
(45) Date of Patent: Dec. 19, 2023

(54) COMPOSITE STRUCTURE SPLICE AND METHOD

(71) Applicant: The Boeing Company, Chicago, IL (US)

(72) Inventors: James R. Kendall, Mount Pleasant, SC (US); Raviendra Sidath Suriyaarachchi, Daniel Island, SC (US); Paul D. Shaw, Charleston, SC (US)

(73) Assignee: The Boeing Company, Chicago, IL (US)

( * ) Notice: Subject to any disclaimer, the term of this patent is extended or adjusted under 35 U.S.C. 154(b) by 853 days.

(21) Appl. No.: 15/918,508

(22) Filed: Mar. 12, 2018

(65) Prior Publication Data

US 2019/0275753 A1    Sep. 12, 2019

(51) Int. Cl.
| | |
|---|---|
| *B29D 99/00* | (2010.01) |
| *B29C 70/34* | (2006.01) |
| *B29C 70/30* | (2006.01) |
| *B29K 105/08* | (2006.01) |
| *B29L 31/30* | (2006.01) |

(52) U.S. Cl.
CPC ........ *B29D 99/0003* (2013.01); *B29C 70/304* (2021.05); *B29C 70/34* (2013.01); *B29K 2105/089* (2013.01); *B29K 2105/0881* (2013.01); *B29L 2031/3076* (2013.01)

(58) Field of Classification Search
CPC .............. B29C 70/34; B29C 66/73921; B29C 66/73941; B29C 66/721; B29C 66/12821; B29C 66/12842; B29C 66/72141; B29K 2105/0881; B29K 2105/089; B29K 2105/0872; B29L 2031/3076;
(Continued)

(56) References Cited

U.S. PATENT DOCUMENTS

| | | | |
|---|---|---|---|
| 5,667,881 | A | 9/1997 | Rasmussen et al. |
| 7,291,373 | B2 | 11/2007 | Bartley-Cho et al. |
| (Continued) | | | |

FOREIGN PATENT DOCUMENTS

| | | | |
|---|---|---|---|
| JP | 2002200606 A | | 7/2002 |
| JP | 2003211416 A | | 7/2003 |
| | (Continued) | | |

OTHER PUBLICATIONS

Japan Patent Office, Office Action and English Translation, dated Jan. 24, 2023, regarding Application No. JP2019-032705, 5 pages.

*Primary Examiner* — S. Behrooz Ghorishi
(74) *Attorney, Agent, or Firm* — Yee & Associates, P.C.

(57) ABSTRACT

A method for fabricating a composite structure. A first section for the composite structure is formed in which the first section has a first end with a chevron shape, wherein first composite layers in the first section has a first step pattern at the first end. A second section for the composite structure is formed in which the second section has a second end with a counterpart shape to the chevron shape and in which second composite layers in the second section have a second step pattern at the second end. The first end the second end are positioned such that a first composite layer in the first composite layers in the first step pattern overlap the second composite layers in the second step pattern at a splice location.

49 Claims, 17 Drawing Sheets

(58) Field of Classification Search
CPC ......... B29L 2031/003; B29L 2031/008; B29D 99/0003; F16S 3/04; B64C 1/064
See application file for complete search history.

(56) References Cited

U.S. PATENT DOCUMENTS

| | | |
|---|---|---|
| 7,325,771 B2 | 2/2008 | Stulc et al. |
| 8,061,035 B2 | 11/2011 | Stulc et al. |
| 8,302,909 B2 | 11/2012 | Cazeneuve et al. |
| 8,869,403 B2 | 10/2014 | Stulc et al. |
| 8,882,040 B2 | 11/2014 | Stulc et al. |
| 9,738,371 B2 | 8/2017 | Stulc et al. |
| 2006/0060705 A1 | 3/2006 | Stulc et al. |
| 2010/0116938 A1 | 5/2010 | Kline et al. |
| 2011/0030380 A1* | 2/2011 | Widdle, Jr. ............. F02K 1/386 60/771 |
| 2013/0089712 A1 | 4/2013 | Kwon et al. |
| 2016/0207266 A1* | 7/2016 | Koncz .................... B29C 70/02 |
| 2016/0257427 A1* | 9/2016 | Humfeld ........... B29C 66/12821 |
| 2017/0183075 A1 | 6/2017 | Stulc et al. |

FOREIGN PATENT DOCUMENTS

| | | |
|---|---|---|
| JP | 2012176514 A | 9/2012 |
| JP | 2017052183 A | 3/2017 |

\* cited by examiner

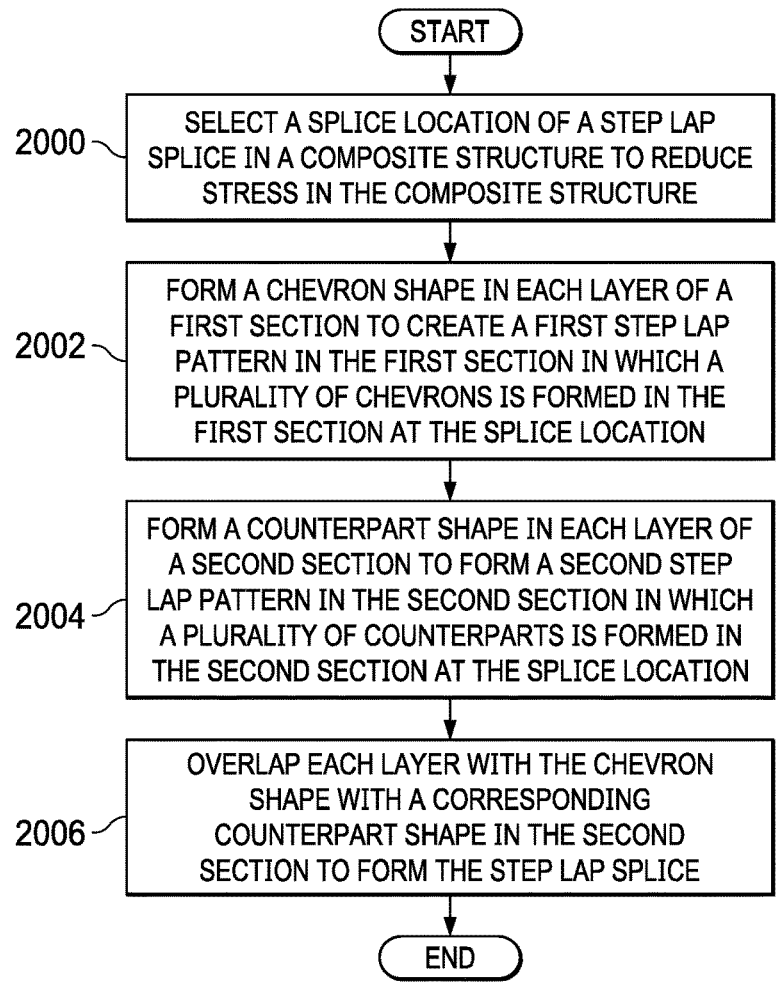
FIG. 20
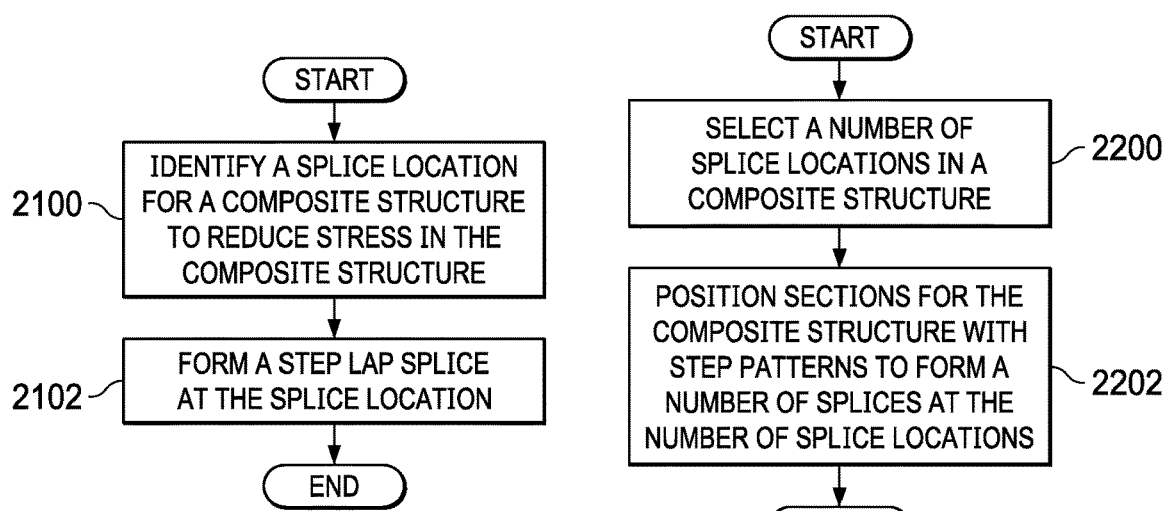
FIG. 21
FIG. 22

COMPOSITE STRUCTURE SPLICE AND METHOD

BACKGROUND INFORMATION

1. Field

The present disclosure relates generally to fabricating composite structures and, in particular, to fabricating composite structures with splices.

2. Background

Composite fuselages contain complex geometries. Portions of the fuselage have a constant diameter. The nose and tail portions of the fuselage have diameters that taper. Further, the complex geometries include stiffeners with bends, twists, and joggles within the interior of the fuselage. As a result, challenges are present in fabricating these stiffeners using automated equipment. The challenges include reducing undesired inconsistencies such as wrinkling, ply bridging, or other undesired inconsistencies.

For example, high contour fabrication can be performed through layer by layer hand draping layers on a tool. This process is labor-intensive and utilizes large amounts of space.

Therefore, it would be desirable to have a method and apparatus that take into account at least some of the issues discussed above, as well as other possible issues. For example, it would be desirable to have a method and apparatus that overcome a technical problem with fabricating composite structures with complex geometries in a manner that reduces undesired inconsistencies.

SUMMARY

An embodiment of the present disclosure provides A method of forming a step lap splice for a composite structure. A chevron shape is formed in each layer of a first section to create a first step lap pattern in the first section in which a plurality of chevrons is formed in the first section. A counterpart shape is formed in each layer of a second section to create a second step lap pattern in the second section in which a plurality of counterparts is formed in the second section. Each layer is overlapped with the chevron shape with a corresponding counterpart shape in the second section to form the step lap splice.

Another embodiment of the present disclosure provides a method for mitigating crack propagation in a composite structure. A splice location is identified for the composite structure to reduce stress in the composite structure. A step lap splice is formed at the splice location in which the step lap splice has a chevron shape in each layer of a first section that forms a first step lap pattern in the first section in which a plurality of chevrons is in the first section. The step lap splice has a counterpart shape in each layer of a second section that forms a second step lap pattern in the second section in which a plurality of counterparts is in the second section. Each layer with the chevron shape overlaps a corresponding counterpart shape for another layer in the second section to form the step lap splice.

Yet another embodiment of the present disclosure provides a composite structure comprising a first step lap pattern and a second step lap pattern. The first step lap pattern is formed by a plurality of chevrons in a first section of the composite structure. The second step lap pattern is formed by a plurality of chevrons in a second section of the composite structure, wherein the first step lap pattern and the second step lap pattern overlap each other to form a step lap splice.

A further embodiment of the present disclosure provides a method for fabricating a composite structure. A first section for the composite structure is formed in which the first section has a first end with a chevron shape, wherein first composite layers in the first section has a first step pattern at the first end. A second section for the composite structure is formed in which the second section has a second end with a counterpart shape to the chevron shape and in which second composite layers in the second section have a second step pattern at the second end. The first end the second end are positioned such that a first composite layer in the first composite layers in the first step pattern overlap the second composite layers in the second step pattern at a splice location.

Yet another embodiment of the present disclosure provides a composite structure comprising a first section and a second section for the composite structure. The first section has a first end with a chevron shape and in which first composite layers in the first section have a first step pattern at the first end. The second section has a second end with a counterpart shape to the chevron shape. A second plurality of composite layers in the second section has a second step pattern at the second end, and the first end and the second end are positioned such that the first composite layers in the first step pattern overlap the second composite layers in the second step pattern at a splice location.

A further embodiment of the present disclosure provides a method for fabricating a composite structure. A first section for the composite structure is formed in which the first section has a first end with a chevron shape in which first composite layers in the first section have a first step pattern at the first end and in which the chevron shape comprises a group of chevrons. A second section for the composite section is formed in which the second section has a second end with a counterpart shape to the chevron shape, and in which second composite layers in the second section have a second step pattern at the second end in which the first section and the second section are substantially planar. The first section and the second section are formed to have a desired cross-sectional shape. The first end and the second end are positioned on a tool such that the first composite layers in the first step pattern overlap the second composite layers in the second step pattern at a splice location to form a lap splice joint in which at least one of a gap or an overlap is present between the first composite layers and the second composite layers such that stress is reduced at the lap splice joint and undesired wrinkling for the composite structure is reduced at the splice location. The first section and second section are cured to form the composite structure.

Yet a further embodiment of the present disclosure provides a composite structure comprising a first section and a second section for the composite structure. The first section has a first end with a chevron shape chevron shape comprised of a group of chevrons and in which first composite layers in the first section have a first step pattern at the first end. A second section for the composite structure is formed in which the second section has a second end with a counterpart shape to the chevron shape in which the first section and the second section have a desired cross-sectional shape, and in which a second plurality of composite layers in the second section has a second step pattern at the second end. The first end and the second end are positioned such that the first composite layers in the first step pattern overlap the second composite layers in the second step pattern at a splice location in which at least one of a gap or an overlap is present between the first composite layers and the second composite layers for a lap splice joint such that stress is reduced at the splice location and in which undesired wrinkling for the composite structure is reduced at the splice location.

Another embodiment of the present disclosure provides a method of placing splices in a composite structure. A number of splice locations in the composite structure is selected. Sections are positioned for the composite structure with step patterns to form a number of splices at the number of splice locations, in which undesired wrinkling is reduced in at least one of a splice location in the number of splice locations or other locations in the composite structure other than the splice location.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 20 is an illustration of a flowchart of a process for forming a step lap splice for a composite structure in accordance with an illustrative embodiment;

FIG. 21 is an illustration of a flowchart of a process for mitigating crack propagation in a composite structure in accordance with an illustrative embodiment;

FIG. 22 is an illustration of a flowchart of a process for placing splices in a composite structure in accordance with an illustrative embodiment;

DETAILED DESCRIPTION

The illustrative embodiments recognize and take into account one or more different considerations. For example, the illustrative embodiments recognize and take into account that laying up composite materials in three-dimensional shapes to form composite structures can be more complex and time-consuming than desired. The illustrative embodiments also recognize and take into account that fabricating composite structures such as stringers with at least one of contours or twists can be performed in a semi-automated fashion. The equipment utilized, however, involves unique or custom tooling for the desired geometries.

Further, the illustrative embodiments recognize and take into account that splicing techniques can be utilized for stiffeners with perpendicular cuts. The illustrative embodiments recognize and take into account that this type of splicing may reduce some amount of wrinkling but does not fully address the occurrence of undesired inconsistencies such as wrinkling. Thus, the illustrative embodiments provide a method, an apparatus, and a system for fabricating composite structures utilizing sections such as charges that can be spliced in a manner that reduces undesired inconsistencies.

In the illustrative examples, these types of composite structures can be fabricated utilizing two-dimensional sections. These two-dimensional sections have configurations that can be spliced in a manner that reduces undesired inconsistencies when utilized in three-dimensional geometries. For example, two-dimensional sections can be formed into complex contoured stringers that can include curves and twisting without generating undesired wrinkles in the stringers.

For example, a chevron approach to splicing can provide isolation between desired regions of the composite structure.

In this manner, arc length and variations can occur while reducing excessive compressive loads. Arc length variation is when a structure is shaped into a curve and an arc shape is present. An arc is present on each side and will have a different length. As the variation between the two arcs increases, the intermediate shear loading will induce compressive buckling (wrinkles) in the side of the structure having the smaller arc.

The illustrative examples can utilize sections having ends with patterns for splices that are designed to provide greater parallel fiber separation in the insured states of the composite materials. This greater separation may occur through regions of higher complexity. The customization may occur through the selection of angles and a number of fibers in these splice regions. Further, the patterns for the ends may be such that parallel fibers are disconnected from each other in the angled splice region via removal of the crossing fibers.

Figure 1:
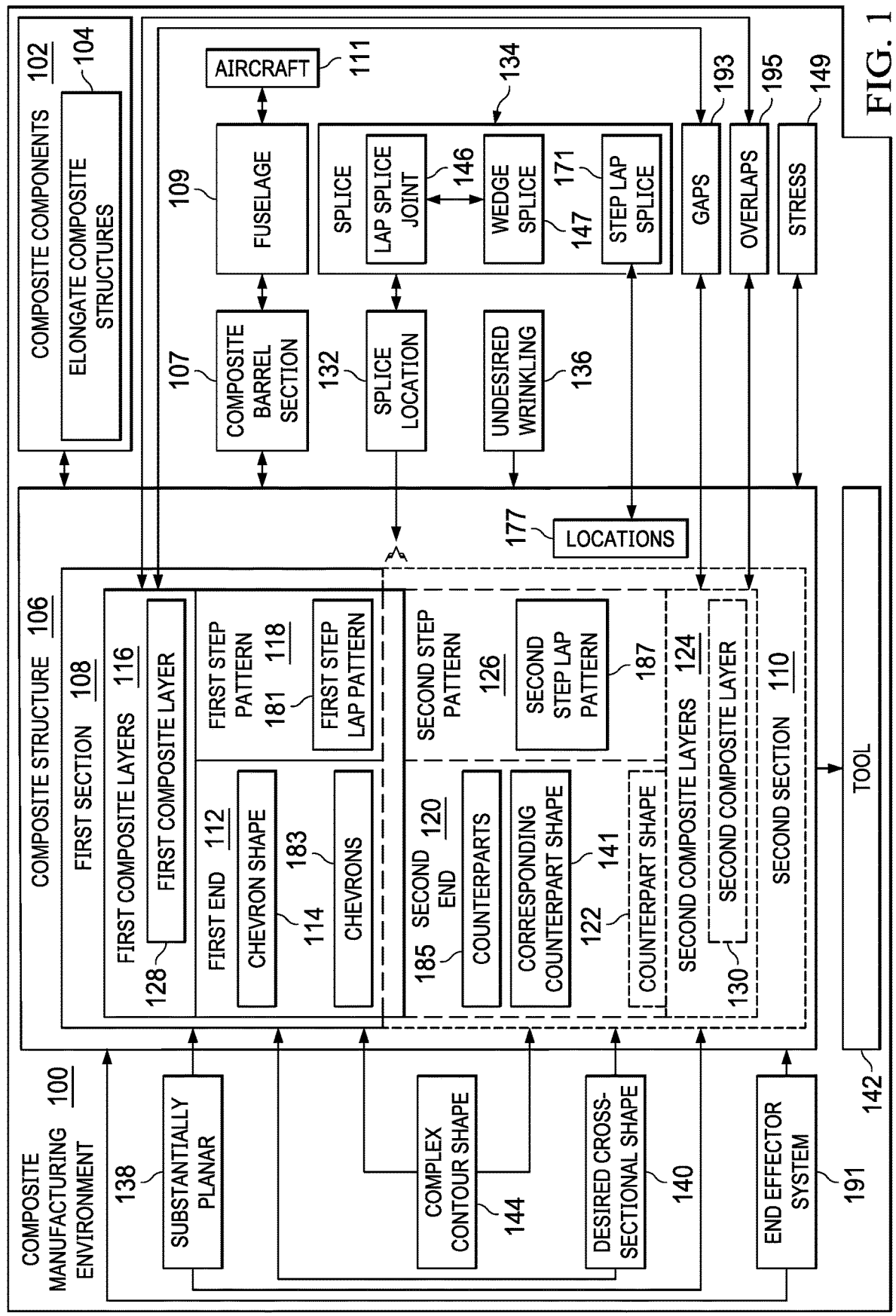
FIG. 1 is an illustration of a block diagram of a composite manufacturing environment in accordance with an illustrative embodiment.

With reference now to the figures and, in particular, with reference to FIG. 1, an illustration of a block diagram of a composite manufacturing environment is depicted in accordance with an illustrative embodiment. Composite manufacturing environment 100 is an example of an environment in which composite components 102 having three dimensions can be fabricated.

Composite components 102 can be elongate composite structures 104. In this example, composite structure 106 in composite components 102. Composite structure 106 can be selected from at least one of an aircraft composite structure, a stiffener, a stringer, a longeron, a beam, or some other suitable type of composite structure. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

When composite structure 106 is a stringer, the stringer is configured to be attached to composite barrel section 107 of fuselage 109 for aircraft 111. In this form, composite structure 106 can have a three-dimensional shape in the form of complex contour shape 144. Complex contour shape 144 can conform to composite barrel section 107.

In this illustrative example, first section 108 and second section 110 can be utilized to form composite structure 106. As depicted, first section 108 for composite structure 106 has first end 112 with chevron shape 114.

In this depicted example, chevron shape 114 can comprise a group of chevrons at first end 112. As used herein, "a group of," when used with reference to items, means one or more items. For example, "a group of chevrons" is one or more chevrons. A chevron is an elongate member that tapers in width towards first end 112.

The selection of the shape for chevron shape 114 can be based on one or more parameters. The parameters include, for example, without limitation, the total amount of material necessary to complete the part, the allowable space and gage of the splice, manufacturing capability, the requirements for overlap, and other suitable parameters.

For example, if one side of a stringer extends across a skin gage padup, the distance that one side of the stringer extends is longer than the other side of the stringer. As a result, the amount of material necessary to complete the part will increase. For example, when chevron components are designed to have a male portion and a female portion at the splice, the overlap length of the female portion that extends over the skin gage padup may be increased in order to accommodate the additional travel distance on the side of the stringer that is longer.

In another example, a requirement for overlapping of the splice may be present that includes the same values in the axial direction and the transverse direction. In this example, a splice angles at a 45-degree angle may be desirable such that both directions (longitudinal and transverse) have the same nominal values of overlap and gap.

In still another example, the overall size of the splice may be limited. As a result, the thickness and amount of overlap in design requirements can be taken into account in designing the shape. In this example, the angle of the splice may be reduced closer to 90 degrees, in effect taking less advantage but allowing the shape to fit within the length constraint. The splice configuration, in the illustrative example, is a scarf splice configuration. In this example, the scarf splice involves two equal thickness step patterns that are brought together such that the complimentary layers are overlapped, resulting in a total thickness that can be one layer greater in the overlap areas and in the gap areas.

In still another example, the manufacturing capability of the laying up layers of composite materials may benefit from increased sizes of the splice when constraint to the length is absent. In this example, the angle of the splice can be lengthened and the overall layer drop spacing can be increased to increase manufacturability.

In yet another example, limitations of the manufacturing equipment can be taken into account. If the layer cutting equipment is only capable of a single angled cut, a single 45-degree angle or other desired angle can be made to take some advantage of the side to side isolation.

Further, first composite layers 116 in first section 108 has first step pattern 118 at first end 112. In this example, second section 110 for composite structure 106 has second end 120 with counterpart shape 122 to chevron shape 114. In the illustrative example, counterpart shape 122 has a shape that compliments the geometry of chevron shape 114 such that the cross-section of the resultant splice creates the cross-section of the desired part.

Second composite layers 124 in second section 110 have second step pattern 126 at second end 120. In this illustrative example, first composite layers 116 is a first prepreg structure and second composite layers 124 is a second prepreg structure. As depicted, first composite layers 116 in first section 108 are a first prepreg structure and second composite layers 124 in second section 110 are a second prepreg structure.

As depicted, first end 112 and second end 120 are positioned relative to each other such that first composite layer 128 in first composite layers 116 in first step pattern 118 overlaps second composite layer 130 in second composite layers 124 in second step pattern 126 at splice location 132 to form splice 134. In the illustrative example, in splice 134, steps in first step pattern 118 and second step pattern 126 interleave with each other. This interleaving of first composite layers 116 with first step pattern 118 at first end 112 and second composite layers 124 with second step pattern 126 at second end 120 forms lap splice joint 146. This splice is also referred to as wedge splice 147.

In this example, undesired wrinkling 136 for composite structure 106 is reduced at splice location 132 when complex contour shape 144 includes at least one of a bend, an angle, a twist, or some other feature at splice location 132.

As depicted, the positioning of first end 112 and second end 120 is such that first composite layer 128 having chevron shape 114 in first composite layers 116 in first step pattern 118 overlaps second composite layer 130 having counterpart shape 122 in second composite layers 124 in second step pattern 126 to form splice 134 in the form of lap splice joint 146 at splice location 132.

When fabricating composite structure 106, first section 108 and second section 110 in composite structure 106 are formed from laying up first composite layers 116 for first section 108 and second composite layers 124 for second section 110 that are substantially planar 138.

In the illustrative examples, first composite layers 116 for first section 108 and second composite layers 124 can be prepreg in which layers of a material, such as a reinforcing fabric, has been pre-impregnated with a resin system.

In the illustrative example, first section 108 and second section 110 can be formed from being substantially planar 138 to have complex contour shape 144 with desired cross-sectional shape 140. In this illustrative example, desired cross-sectional shape 140 is selected from a group comprising a hat shape, a U-shape, a C-shape, or some other suitable cross-sectional shape for complex contour shape 144.

As depicted, first section 108 and second section 110 can be placed on tool 142 for composite structure 106. When placed on tool 142, first section 108 and second section 110 have a three-dimensional shape that is complex contour shape 144 for composite structure 106. First section 108 and second section 110 can be cured on tool 142 to form composite structure 106 with complex contour shape 144.

In another illustrative example, composite structure 106 has step lap splice 171 that is formed from first step lap pattern 181 and second step lap pattern 187. First step lap pattern 181 is formed by a plurality of chevrons 183 in first section 108 of composite structure 106 overlapped with second step lap pattern 187 formed by a plurality of counterparts 185 in second section 110 of composite structure 106.

Further, gaps 193 and overlaps 195 can be present between first composite layers 116 and second composite layers 124 in splice 134. Gaps 193 and overlaps 195 can be configured such that undesired wrinkling 136 is reduced in composite structure 106.

In yet another illustrative example, splice 134 takes the form of step lap splice 171 for composite structure 106 in composite manufacturing environment 100. With splice 134, splice location 132 is selected for step lap splice 171 in composite structure 106 to reduce stress 149 in composite structure 106.

In this example, step lap splice 171 has chevron shape 114 in each layer of first section 108 to create first step lap pattern 181 in first section 108. A plurality of chevrons 183 is formed in first section 108 at splice location 132.

Step lap splice 171 also has counterpart shape 122 in each layer of second section 110 to form second step lap pattern 187 in second section 110. A plurality of counterparts 185 is formed in second section 110 at splice location 132. The layers in first section 108 and second section 110 are composite layers that can be cured. These layers can take the form of plies. Each layer can be formed from one or more plies.

In the illustrative example, the plurality of chevrons 183 and the plurality of counterparts 185 mitigate crack propagation in at least one of composite structure 106 or step lap splice 171. For example, the crack propagation can be mitigated for adjacent splices in other composite structures (not shown) used with composite structure 106 by eliminating the condition where an overlap can exist in the entire transverse cross-section. Avoiding placing these types of splices in different stiffeners (not shown) adjacent to each other can reduce a possibility that a crack can propagate across a splice in one stiffener to splices in other stiffeners. For example, overlaps of chevrons in a stringer can be angled relative to an overlap of chevrons in adjacent stringers. Thus, a crack spreading through a frame bay (not shown) perpendicular to the stiffeners would intercept on overlap in a more head on fashion.

The process overlaps each layer with chevron shape 114 with corresponding counterpart shape 141 in second section 110 to form step lap splice 171. Overlaps 195 and gaps 193 are present in step lap splice 171. Overlaps 195 and gaps 193 are in locations in step lap splice 171 such that undesired wrinkling 136 in composite structure 106 is reduced.

As part of fabricating composite structure 106, end effector system 191 is utilized to steer at least one of first section 108 and second section 110 to overlap each layer with chevron shape 114 with corresponding counterpart shape 141 in second section 110 to form step lap splice 171. End effector system 191 is a physical system in which one or more end effectors are present. The end effector can be moved by robotic arms or other machines to move and place items, such as first section 108 and second section 110.

As depicted, step lap splice 171 can be placed in a number of locations 177 in composite structure 106 in addition to or in place of splice location 132. The number of locations 177 is selected to reduce undesired wrinkling 136 for composite structure 106. For example, splice location 132 for step lap splice 171 can be located such that less undesired wrinkling 136 occurs in at least one of step lap splice 171 or in locations 177 outside of step lap splice 171.

In one illustrative example, one or more technical solutions are present that overcome a technical problem with fabricating composite structures with complex geometries in a manner that reduces undesired inconsistencies. As a result, one or more technical solutions may provide a technical effect utilizing splices with at least one of shapes or step patterns that reduce undesired inconsistencies such as wrinkles.

The illustration of composite manufacturing environment in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more sections may be present in addition to or in place of first section 108 and second section 110. For example, when one additional section is present, an additional splice can be formed in addition to splice 134. As depicted, first composite layers 116 and second composite layers 124 may contain the same or different numbers of layers. In another illustrative example, desired cross-sectional shape 140 may be formed when placing first section 108 and second section 110 on tool 142.

Figure 2:
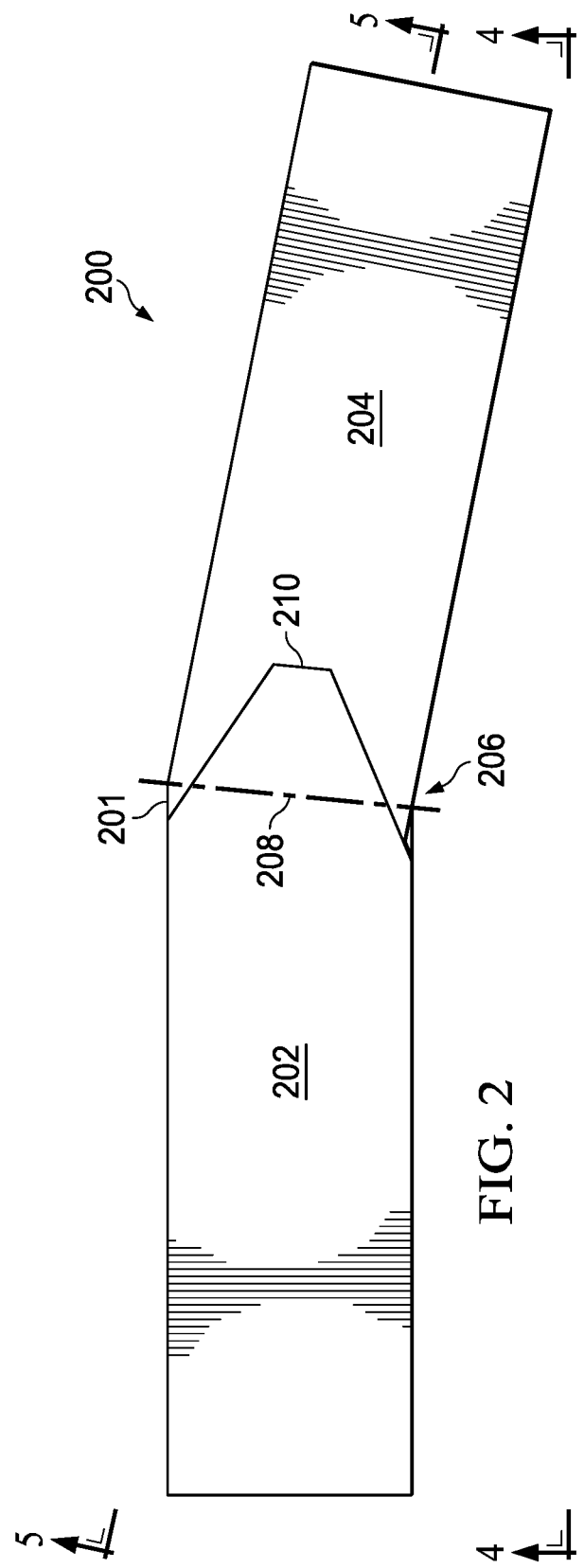
FIG. 2 is an illustration of a composite structure in a form of a stiffener in accordance with an illustrative embodiment.

In FIGS. 2-10, illustrations of a process for forming a composite stiffener are depicted in accordance with an illustrative embodiment. Turning first to FIG. 2, an illustration of a composite structure in the form of a stiffener is depicted in accordance with an illustrative embodiment. A top view of stiffener 200 in an uncured form is depicted. Stiffener 200 is an example of an implementation for composite structure 106 shown in block form in FIG. 1. In this example, stiffener 200 is shown in an uncured form with bend 201.

In this depicted example, stiffener 200 is formed utilizing first section 202 and second section 204. As depicted, these two sections are multi-layered structures in an uncured form and can be positioned relative to each other at splice location 206 as shown by splice center line 208 to form splice 210.

Figure 3:
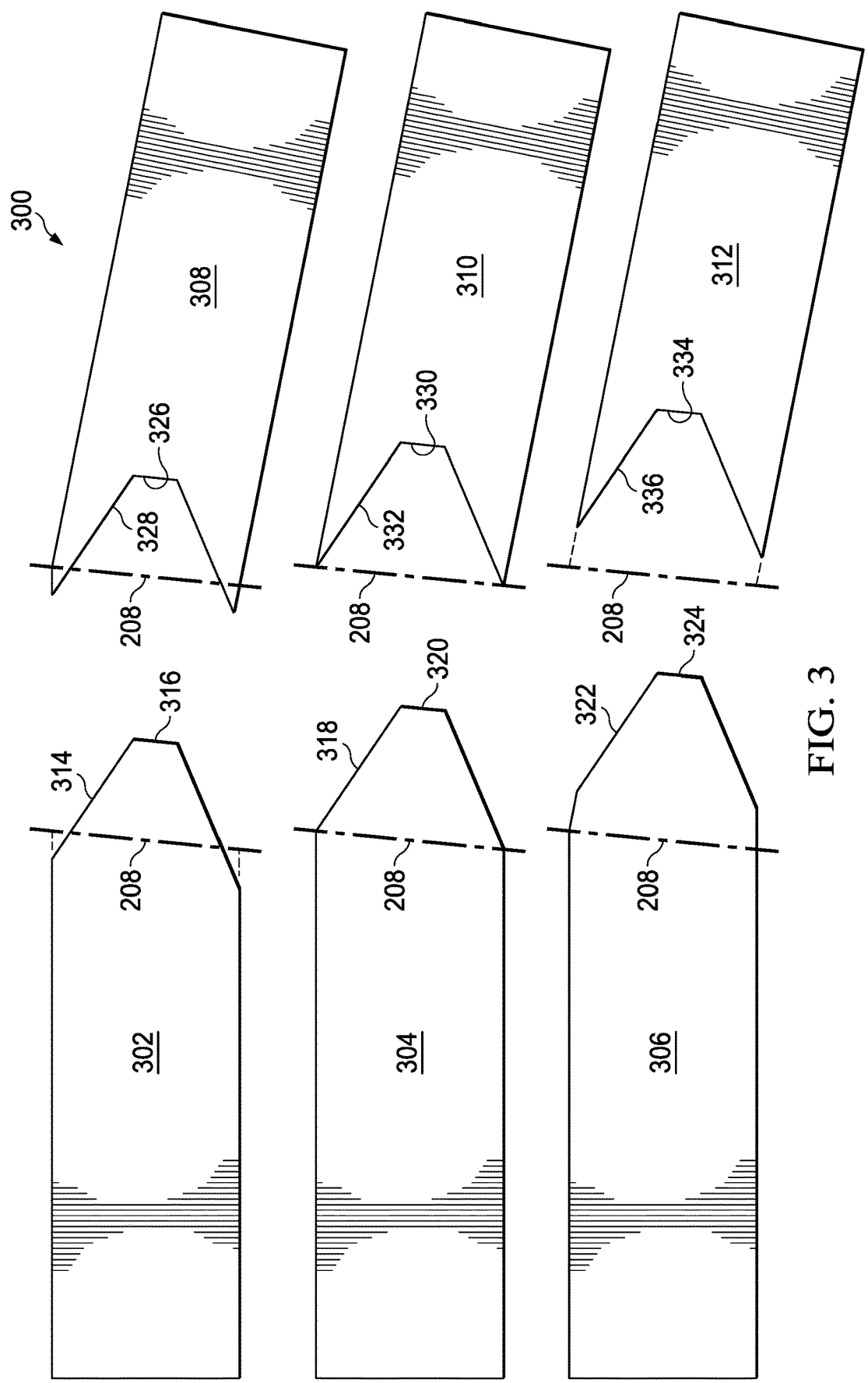
FIG. 3 is an illustration of layers for sections in a stiffener in accordance with an illustrative embodiment.

With reference now to FIG. 3, an illustration of layers for sections in a stiffener is depicted in accordance with an illustrative embodiment. In the illustrative examples, the same reference numeral may be used in more than one figure. This reuse of a reference numeral in different figures represents the same element in the different figures. The layer boundaries are offset with the layers being stacked to form the structure.

In this figure, layers 300 for first section 202 and second section 204 for stiffener 200 in FIG. 2 in an uncured form are depicted. As depicted, layers 300 are composite layers that can take a number of different forms. For example, layers 300 may be fabric that can be impregnated with a resin. In another illustrative example, layers 300 can be formed using a unidirectional material. In other illustrative examples, layers 300 can be prepreg. As depicted, layers 300 includes layer 302, layer 304, and layer 306 for first section 202 in stiffener 200. Layers 300 also includes layer 308, layer 310, and layer 312 for second section 204 in stiffener 200.

As depicted, patterns for layers 300 are shown in this figure. In first section 202, chevron shape 314 is present at first end 316 of layer 302; chevron shape 318 is present at first end 320 of layer 304; chevron shape 322 is present at first end 324 of layer 306. In layers 300 in second section 204, counterpart shape 326 is present at second end 328 of layer 308; counterpart shape 330 is present at second end 332 of layer 310; and counterpart shape 334 is present at second end 336 of layer 312.

In this illustrative example, chevron shape 314, chevron shape 318, and chevron shape 322 each have a single chevron. In other illustrative examples, these shapes may have more than one chevron depending on the particular implementation.

Only three layers are shown in each of the two sections for purposes of illustrating the different features for the illustrative embodiment. Additional layers are present in actual implementations but not shown for purposes of avoiding obscuring the depiction of the different features for the illustrative embodiments.

Figure 4:
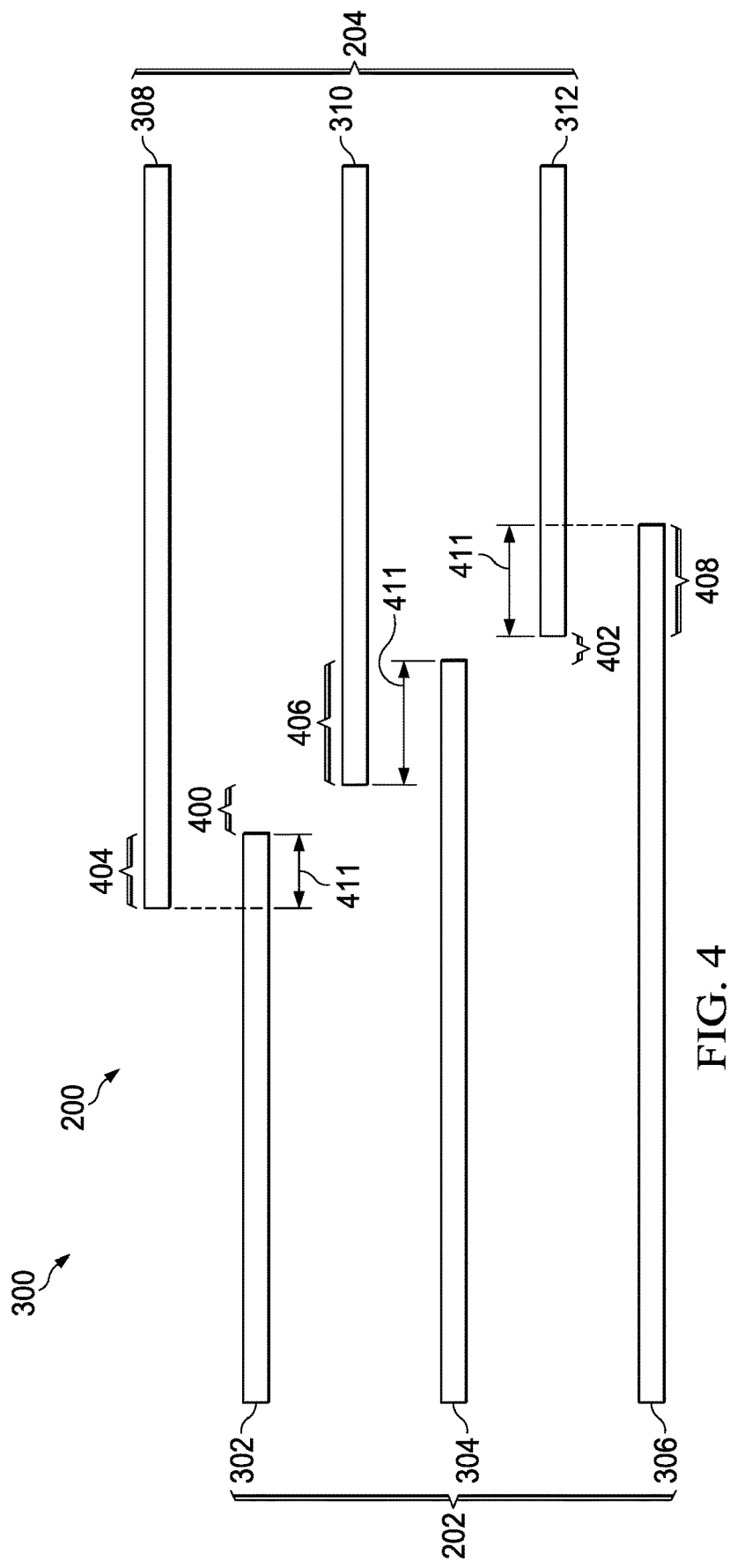
FIG. 4 is an illustration an exploded side view of sections for a stiffener in accordance with an illustrative embodiment.

With reference to FIG. 4, an illustration an exploded side view of sections for a stiffener is depicted in accordance with an illustrative embodiment. In this figure, an exploded side view of first section 202 and second section 204 for stiffener 200 is shown in the direction of lines 4-4 in FIG. 2.

In this view, gaps and overlaps between layers 300 can be seen. For example, gap 400 is present between layer 308 in second section 204 and layer 302 in first section 202. Gap 402 is present between layer 304 in first section 202 and layer 312 in second section 204.

As depicted, overlap 404 is present with layer 308 in second section 204 and layer 302 in first section 202. Additionally, overlap 406 is present with layer 310 in second section 204 and layer 304 in first section 202. Overlap 408 is present with layer 312 in second section 204 and layer 306 in first section 202.

In this example, the overlaps in this figure can have lengths 411 that are selected to transfer the load across the splice. Gap 400 and gap 402 are designed to reduce undesired overlap (not shown). Gap 400 and gap 402 cause a lower pressure zone. A wrinkle can occur in gap 400 and gap 402. In this manner, the wrinkling at gap 400 and gap 402 can be controlled along with length 411 of overlap 404, overlap 406, and overlap 408 to reduce the size of wrinkles. For example, multiple smaller wrinkles may be present instead of a single larger wrinkle. In this example, the smaller wrinkles can be distributed such that a desired strength in the structure is maintained. The wrinkles can be described in terms of height (valley to peak) as a ratio to the thickness (d/t) of the section and a ratio of the length of the wrinkle to that height (L/D). For example, a wrinkle which has a D/t of 0.5 (50% amplitude ratio to the thickness of the section) and a L/D of 10 is a larger deviation than say a d/t of 0.1 and L/D of 50.

In this manner, the selection of the overlaps and gaps can be selected to obtained desired strength properties and reduce undesired wrinkling at the splice. As depicted, these smaller wrinkles do not appreciably increase layer thickness.

Figure 5:
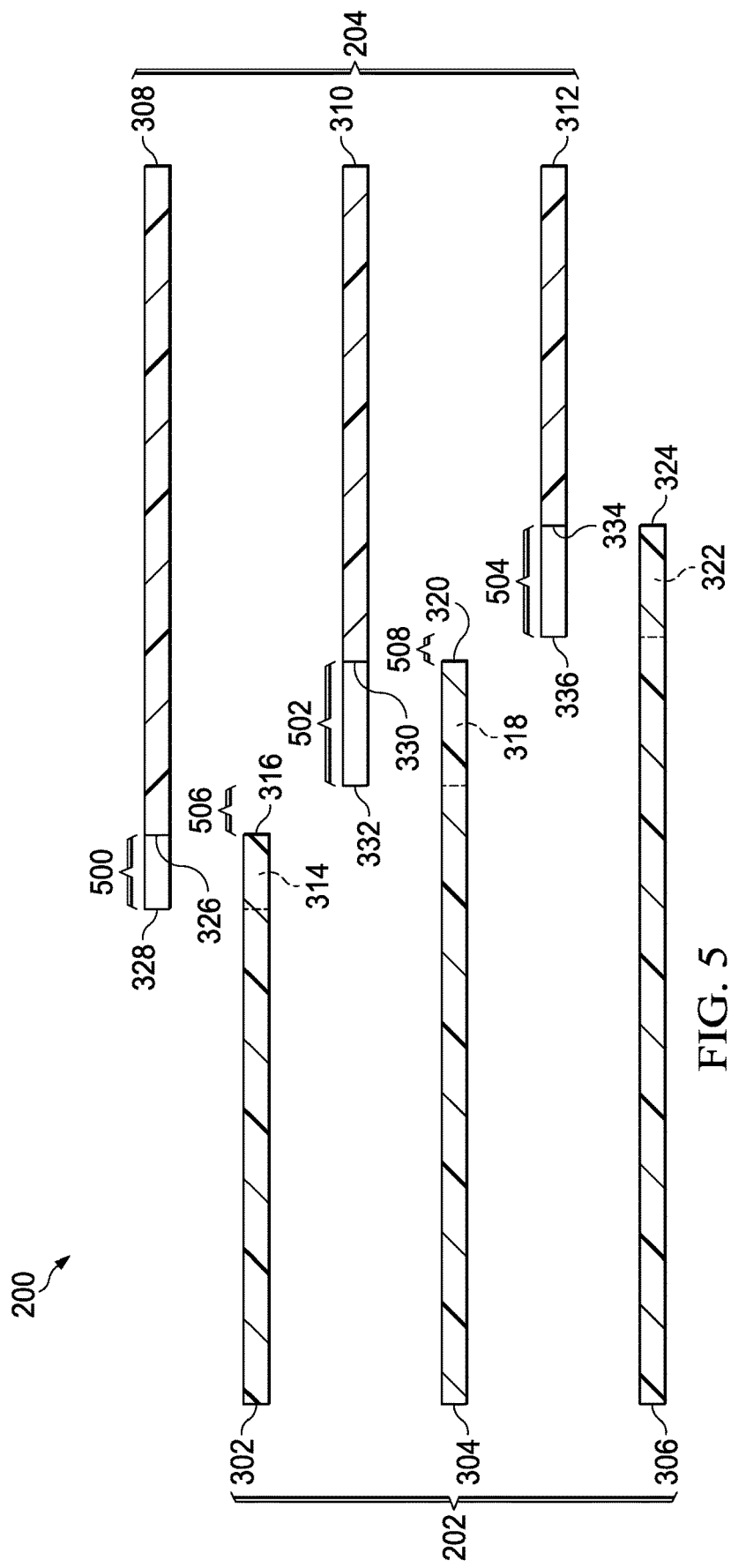
FIG. 5 is an illustration of an exploded cross-section of sections for a stiffener in accordance with an illustrative embodiment.

Turning to FIG. 5, an illustration of an exploded cross-section of sections for a stiffener is depicted in accordance with an illustrative embodiment. In this figure, an exploded cross-sectional view of first section 202 and second section 204 for stiffener 200 is shown taken along lines 5-5 in FIG. 2. In this cross-sectional view, layer 302, layer 304, and layer 306 are seen for first section 202; and layer 308, layer 310, and layer 312 are seen for second section 204.

In this cross-sectional view, a center of chevron shape 314 at first end 316 of layer 302; chevron shape 318 at first end 320 of layer 304; and chevron shape 322 at first end 324 of layer 306 are seen. Further, a center of counterpart shape 326 at second end 328 of layer 308; counterpart shape 330 at second end 332 of layer 310; and counterpart shape 334 at second end 336 of layer 312 are also illustrated.

In this view, overlap 500 is present between layer 302 in first section 202 and layer 308 in second section 204. Overlap 502 is present between layer 304 in first section 202 and layer 310 in second section 204. Further, overlap 504 is present between layer 306 in first section 202 and layer 312 in second section 204.

Further, gap 506 is present between layer 302 in first section 202 and layer 310 in second section 204. Gap 508 is present between layer 304 in first section 202 and layer 312 in second section 204.

Figure 6:
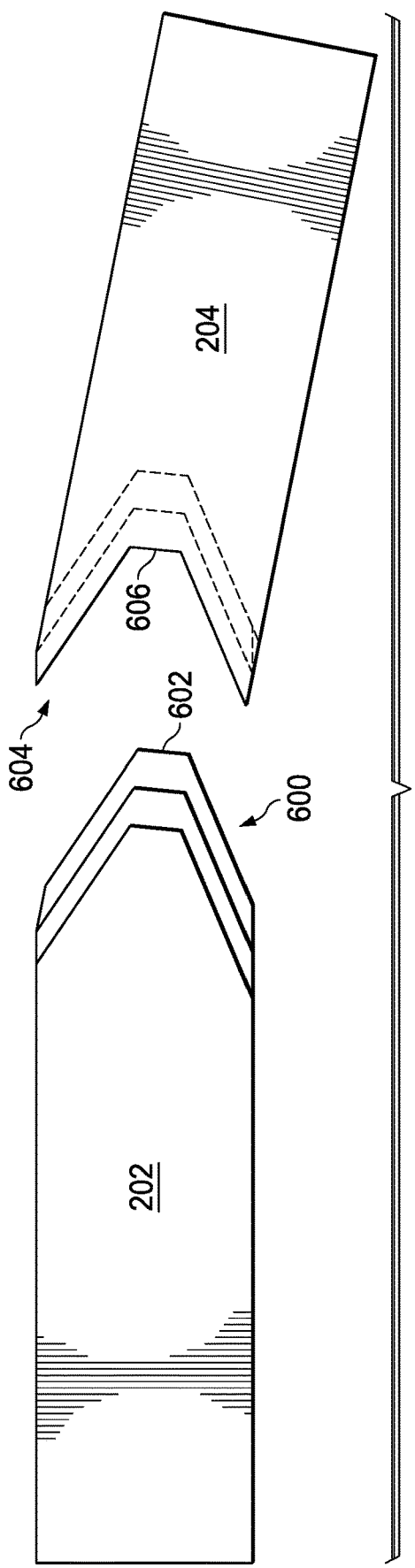
FIG. 6 is an illustration of step patterns for sections for a stiffener in accordance with an illustrative embodiment.

With reference next to FIG. 6, an illustration of step patterns for sections for a stiffener is depicted in accordance with an illustrative embodiment. In this view, first step pattern 600 includes chevron shapes at first end 602 of first section 202. First step pattern 600 is formed from layer 302, layer 304, and layer 306. As depicted, second step pattern 604 is formed from the counterpart shapes in layer 308, layer 310, and layer 312 at second end 606 for second section 204.

Figure 7:
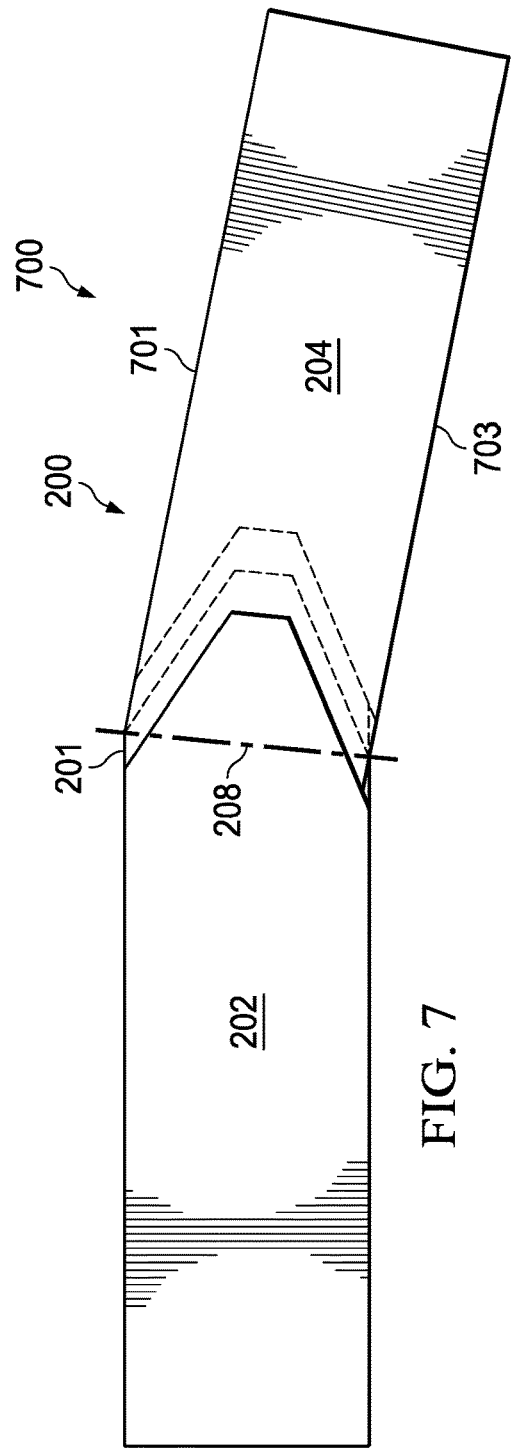
FIG. 7 is an illustration of a first section and a second section positioned to form a stiffener in accordance with an illustrative embodiment.

Turning now to FIG. 7, an illustration of a first section and a second section positioned to form a stiffener is depicted in accordance with an illustrative embodiment. In this example, second section 204 has been placed onto first section 202 to form shape 700 for stiffener 200. In this illustrative example, bend 201 can be added by increasing the outside radius longer on one side versus the other side. For example, side 701 would have a longer radius than side 703 in second section 204.

Figure 8:
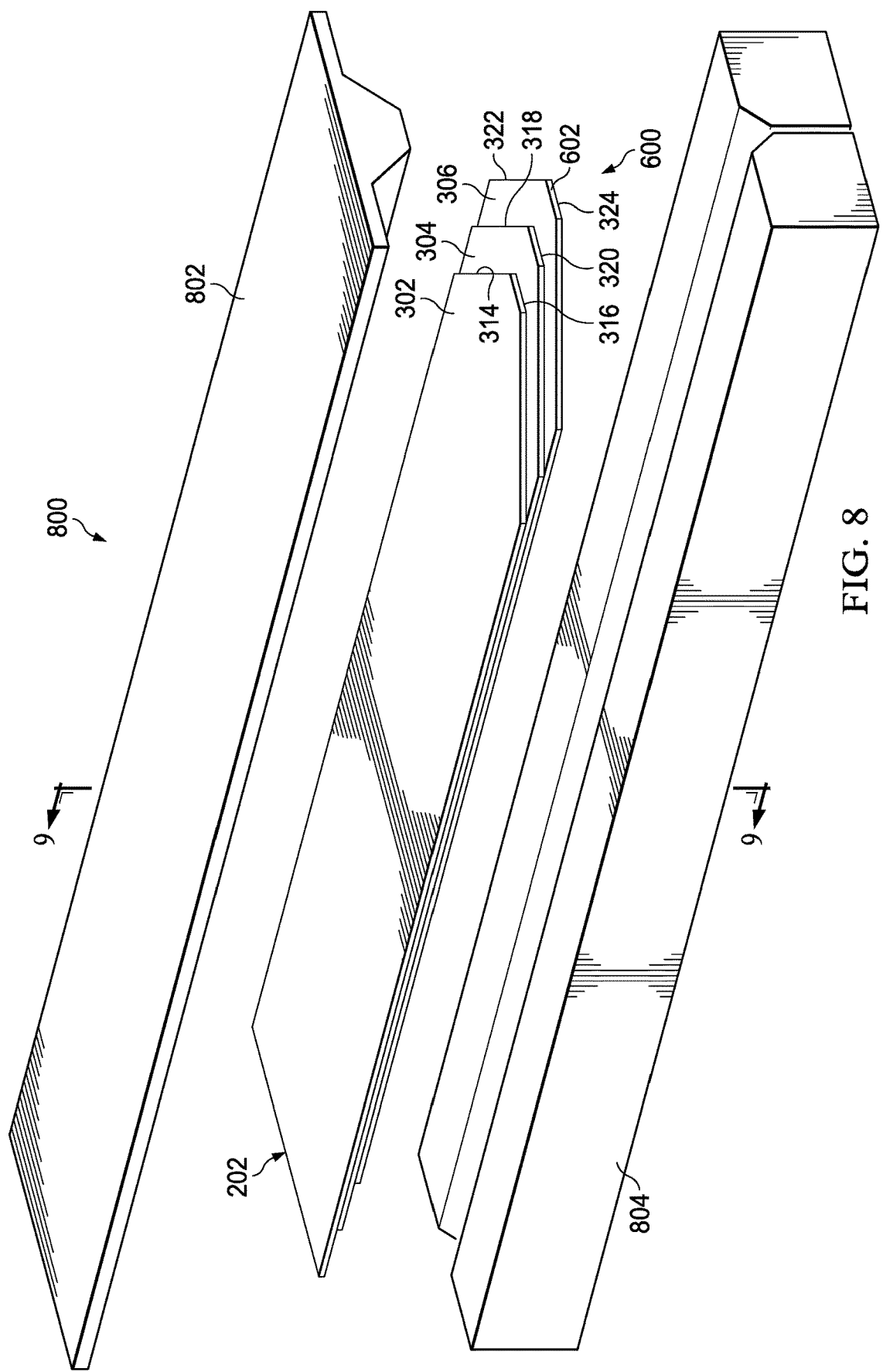
FIG. 8 is an illustration of a tool for forming a desired shape for a section of a stiffener in accordance with an illustrative embodiment.

With reference to FIG. 8, an illustration of a tool for forming a desired shape for a section of a stiffener is depicted in accordance with an illustrative embodiment. In this illustrative example, a perspective view of first section 202 located in tool 800 is shown. In this illustrative example, tool 800 comprises upper die 802 and lower die 804. First section 202 is located within tool 800 between upper die 802 and lower die 804. In this location, first section 202 can be compressed and consolidated by tool 800.

Figure 9:
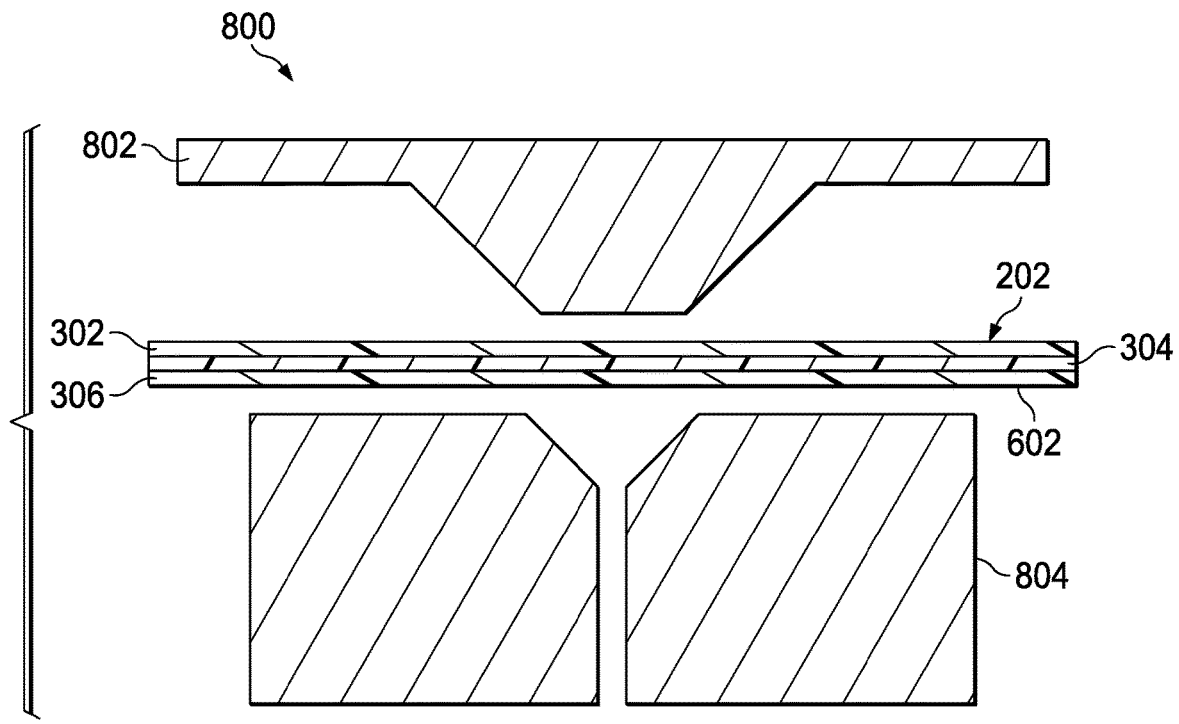
FIG. 9 is an illustration of a cross-sectional view of a section of a stiffener and a tool in accordance with an illustrative embodiment.

In FIG. 9, an illustration of a cross-sectional view of a section of a stiffener and a tool is depicted in accordance with an illustrative embodiment. In this figure, a cross-sectional view of first section 202 in tool 800 is shown in a cross-section taken along lines 9-9 in FIG. 8. As can be seen in this view, first section 202 is located between upper die 802 and lower die 804 of tool 800.

Figure 10:
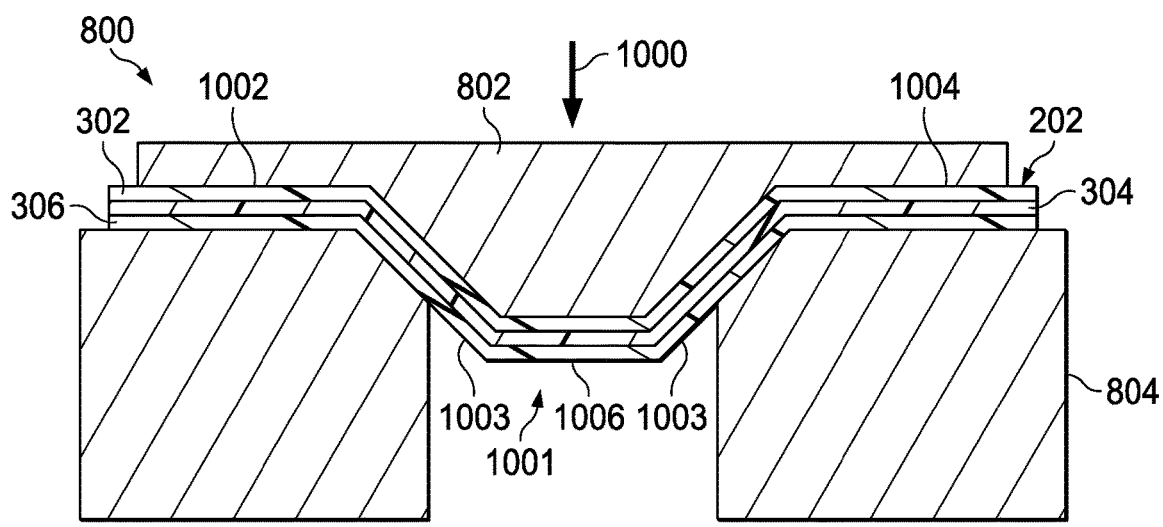
FIG. 10 is an illustration of a cross-sectional view of a section of a stiffener forming a desired cross-sectional shape by a tool in accordance with an illustrative embodiment.

With reference now to FIG. 10, an illustration of a cross-sectional view of a section of a stiffener forming a desired cross-sectional shape by a tool is depicted in accordance with an illustrative embodiment. In this figure, a cross-section taken along lines 9-9 in FIG. 8 is shown in which upper die 802 has been moved towards lower die 804 in the direction of arrow 1000.

As depicted, first section 202 has a cross-sectional shape in the form of hat shape 1001. Hat shape 1001 comprises flange 1002, flange 1004, web 1003, and cap 1006.

In FIGS. 8-10, a forming method is used where layers 300 of stiffener 200 are controlled such that layers 300 do not slip layer to layer. For example, layer 302, layer 304, and layer 306 can be processed in a manner that avoid slipping between these layers as shown in the figures.

With a joggle, the splices can be placed such that assembly occurs sequentially down the length of the sections. Additionally, first section 202 with the chevron shape at first end 602 is placed onto lower die 804. Second section 204 with the counterpart shape at second end 606 is the second component placed onto lower die 804. Second section 203 (not shown) can be formed to have a cross-sectional shape in the form of hat shape 1001 in a similar manner.

Figure 11:
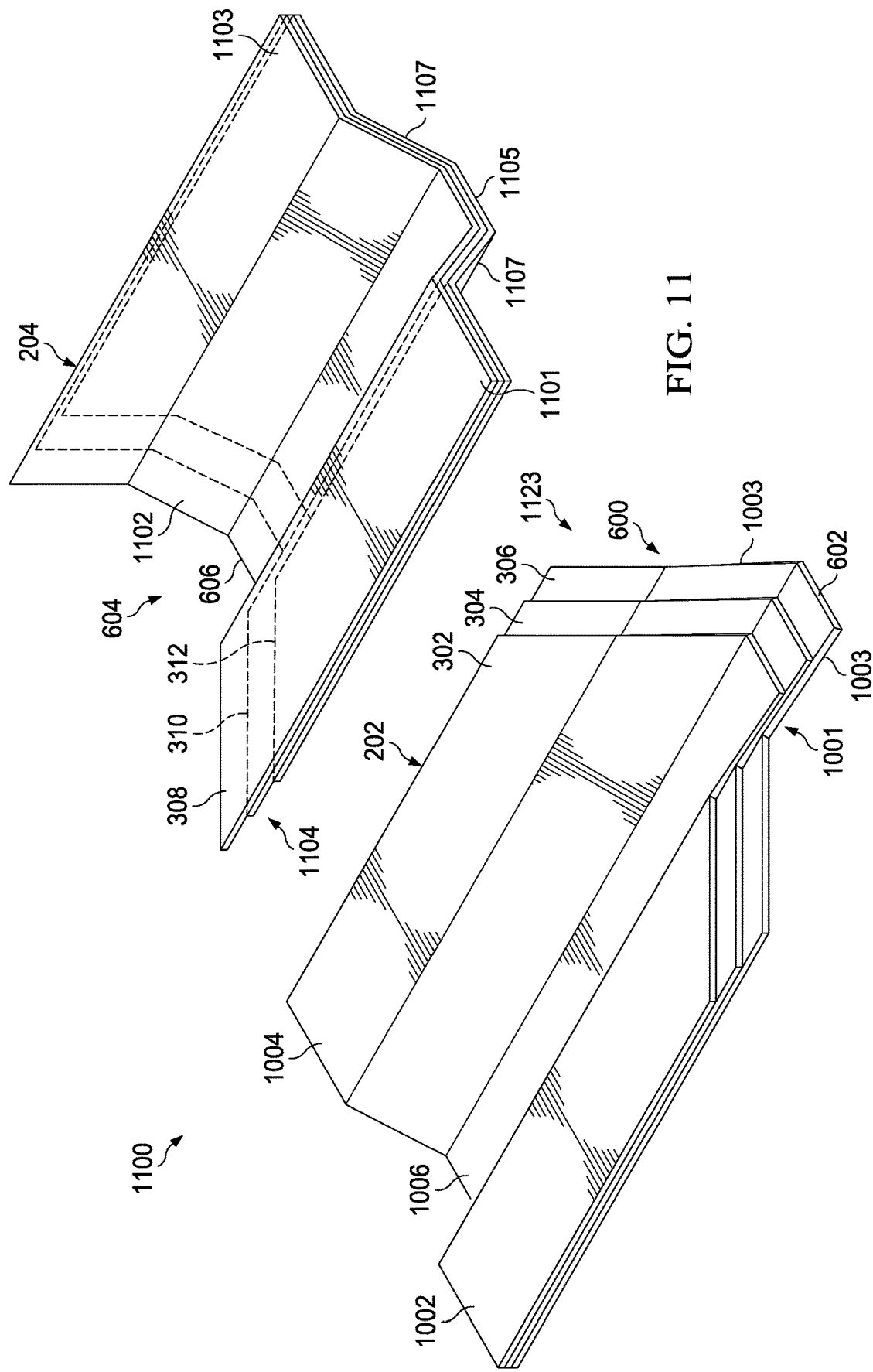
FIG. 11 is an illustration of sections with hat-shaped cross-sections in accordance with an illustrative embodiment.

With reference now to FIG. 11, an illustration of sections with hat shape cross-sections is depicted in accordance with an illustrative embodiment. In this figure, a perspective view of sections 1100 are shown. First section 202 is shown after being formed with flange 1002, flange 1004, web 1003, and cap 1006 to have hat shape 1001, and second section 204 is shown after being formed with flange 1101, flange 1103, web 1107, and cap 1105 to have hat shape 1102.

As depicted, first step pattern 600 in first section 202 is seen with steps 1123. In this example, steps 1123 are formed in first section 202 by staggering layer 302, layer 304, and layer 306 at first end 602.

A perspective view of second section 204 is also shown after being formed into hat shape 1102. As depicted, second step pattern 604 is seen at second end 606 of second section 204. Steps 1104 are formed by staggering layer 308 layer 310 and layer 312. Steps 1123 correspond to steps 1104 in this example such that steps 1123 can be overlapped with steps 1104. In other illustrative examples, steps 1123 and steps 1104 can be configured such that steps 1123 can be interleaved with steps 1104.

Figure 12:
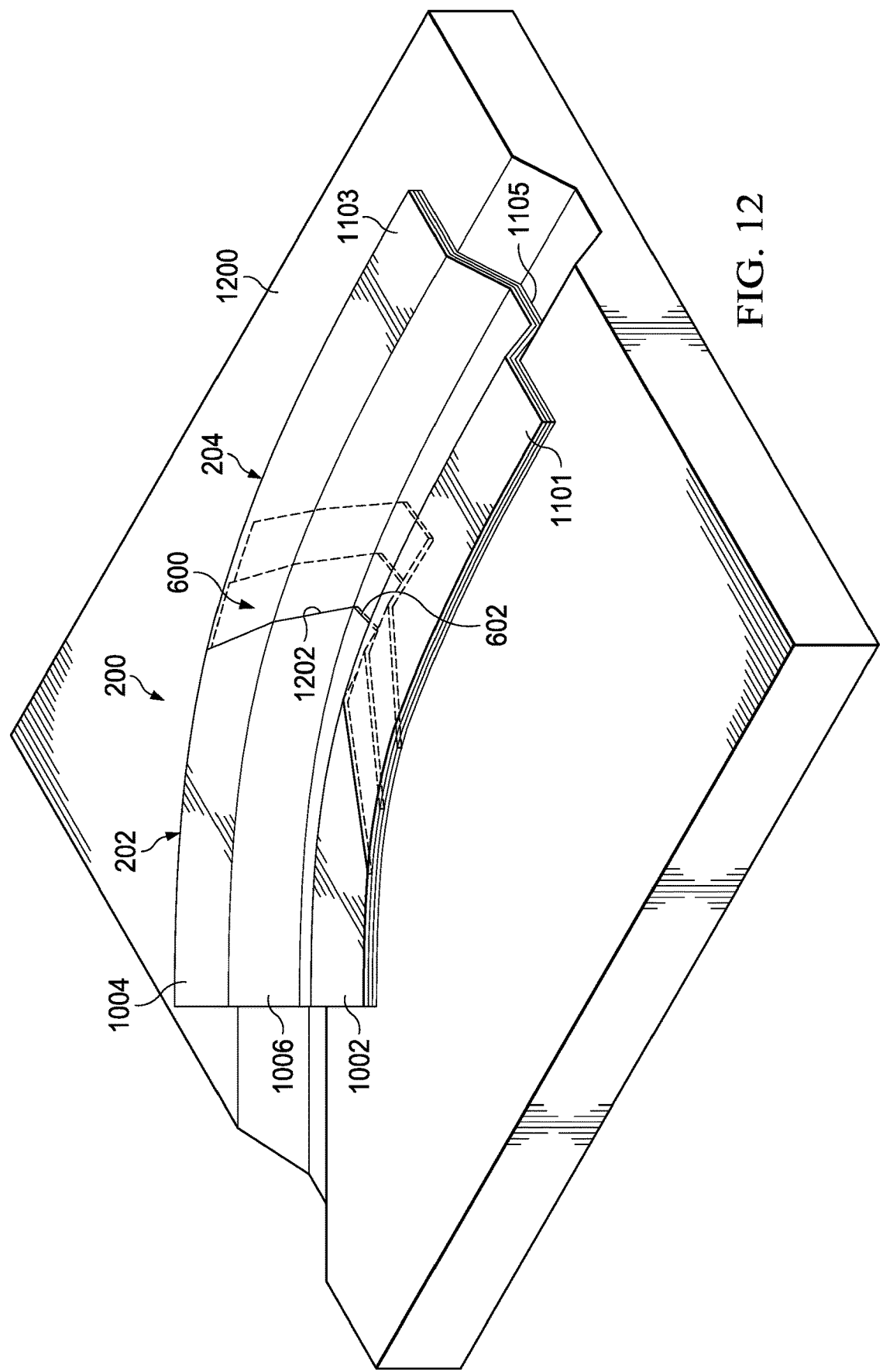
FIG. 12 is an illustration of two sections of a stiffener placed on a tool in accordance with an illustrative embodiment.

Turning to FIG. 12, an illustration of two sections of a stiffener placed on a tool is depicted in accordance with an illustrative embodiment. As depicted, first section 202 and second section 204 have been placed onto tool 1200. In this example, tool 1200 is a female tool that contacts outer surface of stiffener 200.

In this view, first section 202 is placed onto tool 1200. In this example, tool 1200 is a female tool. In other illustrative examples, a male tool can be used in place of a female tool.

Thereafter, second section 204 is placed onto tool 1200 such that second step pattern 604 (not shown) and second section 204 overlap first step pattern 600 (not shown) in first section 202. This overlap can be a scarf or stepped-lap that forms splice 1202 in this illustrative example. First section 202 and second section 204 can be cured on tool 1200 to form stiffener 200.

Figure 13:
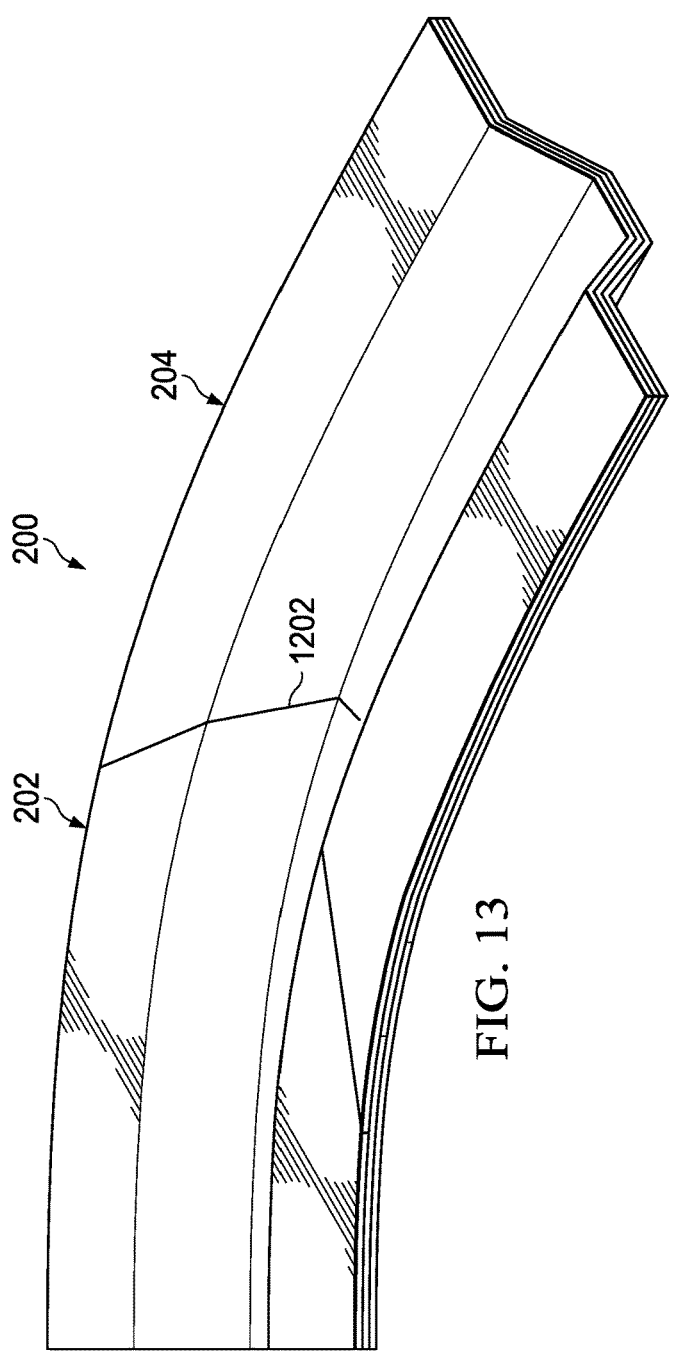
FIG. 13 is an illustration of a stiffener in accordance with an illustrative embodiment.

With reference to FIG. 13, an illustration of a stiffener is depicted in accordance with an illustrative embodiment. In this example, stiffener 200 is shown in a cured form having a three-dimensional shape. This configuration of stiffener 200 allows for forming a bend in a hat-shaped stringer with no wrinkles or with controlled wrinkling to obtain desired performance for the hat-shaped stiffeners.

The illustration of operations for forming a stiffener utilizing two sections in FIGS. 2-13 are shown for purposes of illustrating one manner in which composite structure 106 in FIG. 1 can be formed in accordance with an illustrative embodiment. This illustration is not meant to limit the manner in which other illustrative examples can be implemented.

For example, other illustrative examples may include more than one splice. When more than one splice is present, each splice has separate regions in which steps with chevron shapes and steps with counterpart shapes can be joined. For example, three sections may be utilized in a composite structure to form two splices. Further, other numbers of layers can be used. For example, 10 layers, 17 layers, 19 layers, 33 layers, or some other number of layers can be used in the different sections. Further, in another illustrative example, first section 202 may have a different number of layers from second section 204. In yet another illustrative example, a group of fluorinated ethylene propylene (FEP) films can be used as a release layer to separate the parts.

Figure 14:
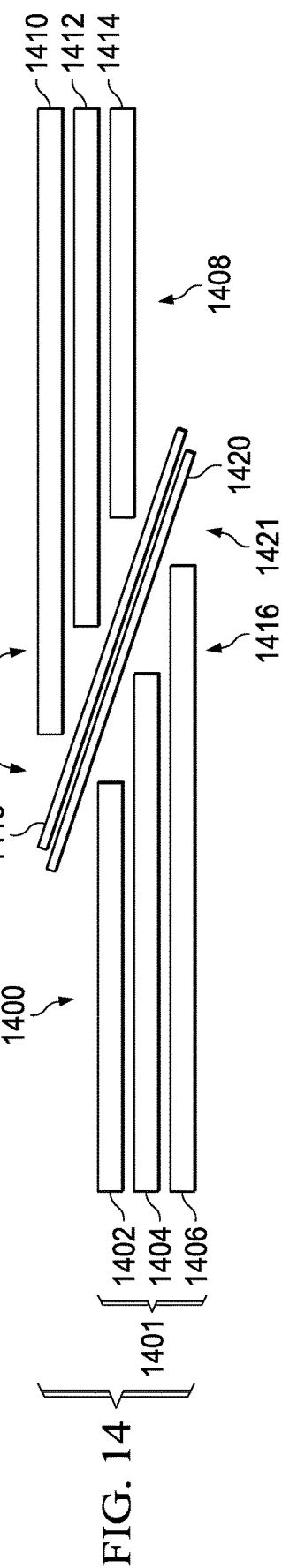
FIG. 14 is an illustration of a release layer used in processing a section in accordance with an illustrative embodiment.

Turning to FIG. 14, an illustration of a release layer used in processing a section is depicted in accordance with an illustrative embodiment. As depicted, a side view of section 1400 is shown. Section 1400 has layers 1401. As depicted, layers 1401 comprise layer 1402, layer 1404, and layer 1406. Layers 1401 have chevron shape 1421 at end 1423. In this depicted example, shim 1408 is used to align the layup of layers 1401 in section 1400 at end 1423. Shim 1408 has layer 1410, layer 1412, and layer 1414. Shim 1408 can have the counterpart shape to the chevron shape in section 1400. Shim 1408 can be comprised of the same prepreg material as section 1400. The selection of the material can be made to provide a smooth transition, thickness such that step pattern 1415 in shim 1408 is similar to step pattern 1416 in section 1400.

As depicted in this illustrative example, FEP film layer 1418 and FEP film layer 1420 are placed in between step pattern 1415 in shim 1408 and step pattern 1416 in section 1400. FEP film layer 1418 and FEP film layer 1420 function as release layers to allow for easy release of shim 1408 from section 1400 without distorting shaped layers. For example, when section 1400 is formed into a hat shape or some other shape, shim 1408 can be more easily removed utilizing FEP film layer 1418 and FEP film layer 1420. Of course, in other illustrative examples, of other numbers of FEP film layers can be used. For example, two layers, four layers, or some other number of layers can be used in other illustrative examples.

Alternatively, instead of using shim 1408, a second section (not shown) can be used in place of shim 1408. For example, if layers 1401 have a chevron shape (not shown), a second section (not shown) with a counterpart shape to the chevron shape can be used in place of shim 1408 at end 1423.

Figure 15:
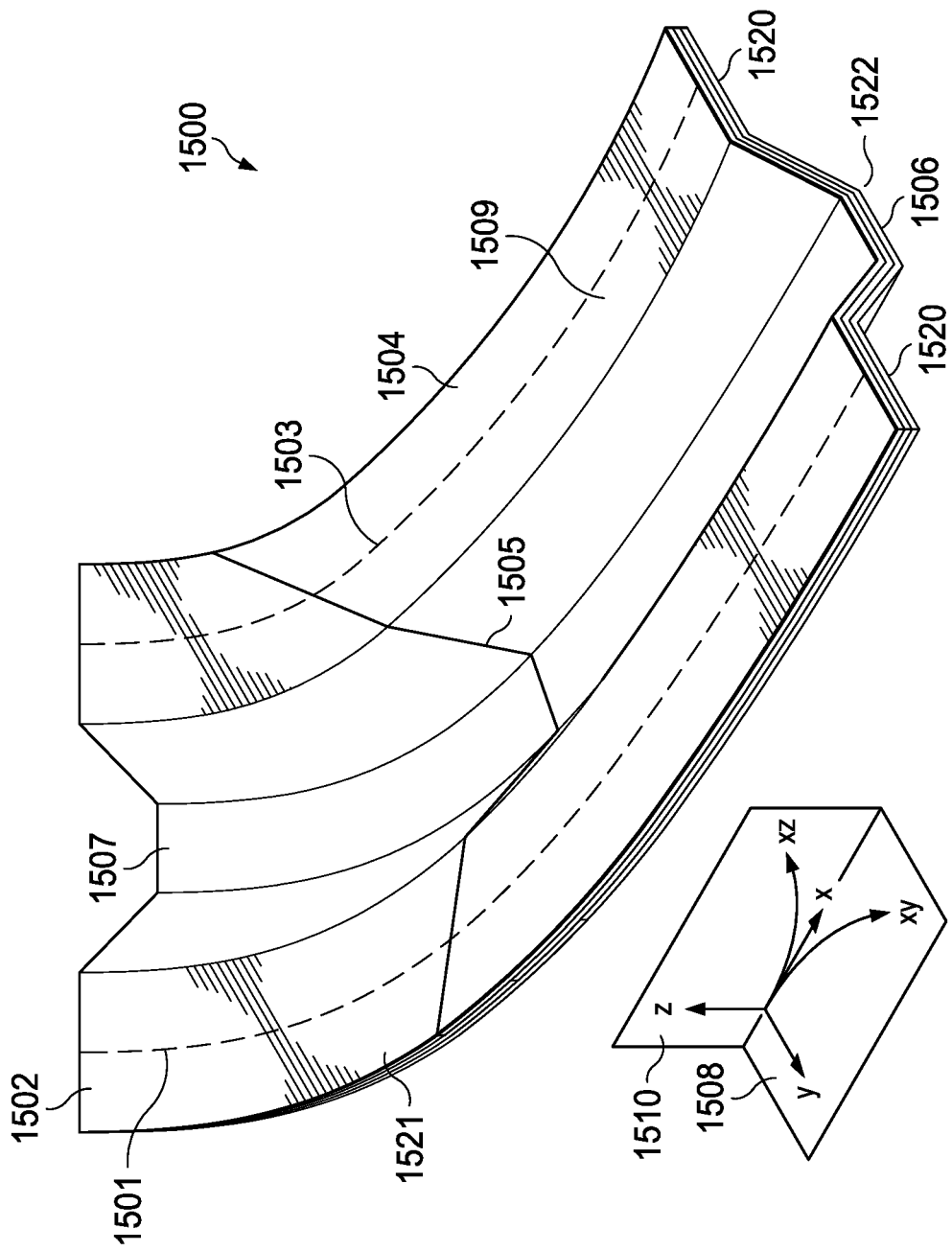
FIG. 15 is an illustration of arc length variation in a composite structure in accordance with an illustrative embodiment.

With reference now to FIG. 15, an illustration of arc length variation in a composite structure is depicted in accordance with an illustrative embodiment. In this illustrative example, hat-shaped stiffener 1500 is an example of an implementation for composite structure 106 in FIG. 1. In this example, hat-shaped stiffener 1500 has flange 1502, flange 1504, and web 1506.

In the illustrative example, hat-shaped stiffener 1500 has arc 1501 and arc 1503. With the curve 1521 in hat-shaped stiffener 1500, the length of arc 1501 is longer than the length of arc 1503.

As depicted, the selection of splice 1505 where section 1507 and section 1509 are connected to each other is made to reduce issues that can occur with unequal lengths between arc 1501 and arc 1503. Further the design of layers (not shown) and shapes (not shown) of the layers can be made to reduce issues with wrinkling and to obtained desired performance for hat-shaped stiffener 1500. More than one splice can be used at the different points needed to facilitate stringers with reduced rate through a curve or joggle. The addition of splices will break up arc length imbalance. Over a certain radius, mismatch length relief will occur. The splices give the opportunity for relief In the illustrative example, processes can be employed during programming of equipment that cut material to form patterns for layers to create asymmetry in the one or both counterparts to accommodate differences in arc length and maintain required overlap tolerances. For example, flat patterning methods are available in modeling software typically used in the aerospace industry. Further, cut patterns for the layers can be created to take into account curvature.

Additional splices may be used. For example, a longer stringer that has a long sweeping curve may require multiple splices. These splices can be located where the curve interacts with other features, such as joggles, a twist, additional curvature, internal layer drops, or other suitable features that increase buckling.

As the curvature increases, the frequency and magnitude of the wrinkles can be reduced to an acceptable level in which performance of hat-shaped stiffener 1500 is not reduced to a level that at least one of undesirable or out of specification. For example, extra fiber length can be induced to buckle in more locations rather than a fewer locations. Correction factors can be used in computer numerical control equipment to cut patterns in layers. These correction factors can be used to accommodate additional lengths of material that will buckle while still resulting in adequate material to maintain desired overlap tolerances. As depicted, XY plane 1508 may be used to show in-plane curvature. XZ plane 1510 shows out-of-plane curvature.

In this illustrative example, a natural response of hat-shaped stiffener 1500 to bending in XZ plane 1510 is to flatten out. If the cross-section of hat-shaped stiffener 1500 is held to the original shape to reduce flattening, wrinkles can occur either in web 1506, flange 1502, or flange 1504. A similar response occurs to bending in XY plane 1508.

This wrinkling occurs because the geometry of hat-shaped stiffener 1500 has two primary planes, web 1506, flange 1504 for XZ plane 1510, and flange 1502 for XY plane 1508. Web 1506, flange 1502, and flange 1504 are being driven into two different arcs while constrained through the cross-section.

This situation occurs because the geometry of the stiffener has two primary planes that are being driven into two different arcs while constrained through the cross-section. These two planes are web 1506 and flange 1504 for XZ plane 1510 and flange 1502 to flange 1504 for XY plane 1508.

In the illustrative example, the outer radius of curvature does not elongate. Therefore, the entirety of the delta in arc length is driven to the inner radius, with the compressive load in the material increasing from the outer radii towards the inner radii until the compressive loads exceed the buckling threshold of the layup. In this example, the inner radii (for XY plane curvature the inside flange, for XZ plane curvature either at the cap or at the flange depending on the direction of bend) the highest compression loads. In some cases, buckling can extend into the webs in both XY plane curvature and XZ plane. In the illustrative examples, buckling means that wrinkles are formed.

This constraint in the cross-section occurs through the layup thickness between the two surfaces, surface 1520 and surface 1522, and is a function of at least one of layer-by-layer adhesion, individual layer stiffness, or combined layer layup stiffness characteristics. Surface 1520, is defined by the two flanges for hat-shaped stiffener 1500, flange 1502 and flange 1504. Surface 1522 is defined by web 1506.

This constraint creates tension in the longer arc length and compression in the shorter arc length. As depicted, the constraint is in the cross-section of hat-shaped stiffener 1500. The location and number of splices used can be determined by specifications for the part. For example, fasteners, frames, and location splices will have rules that define where splices are not placed.

The number and position of splices along the length of a stiffener, such as hat-shaped stiffener 1500, is driven by a number of different factors. For example, it is desirable to minimize the number of splices because fundamentally two sections to form a stiffener that require assembly is harder than a single section for a stiffener that does not require assembly. Additionally, splices in adjacent or subsequent grid cells may be undesirable because of the manner in which an aircraft is analyzed based on stiffeners and frames as a grid.

As another example, a factor includes a splice designed such that one splice is present one per frame bay (stiffener between the frames). As another example, the size of a splice can be the same size or larger than a joggle. The apex, if available, is a desirable location for the splice for a curved stringer with a sharp apex bend having straighter lengths on either side. If the curve of the stringer is more general, more splices may be desirable along the curve.

Subject to the specification limiting splice locations and numbers, a splice can be formed at locations where a wrinkle would manifest without the splice. For example, a joggled area may be spliced or a high curvature area may be spliced at the apex. Alternatively, if multiple splices are used in a curved area, the areas immediately on either side of the apex (probably the adjacent frame bays forward and aft) may be spliced.

Figure 16:
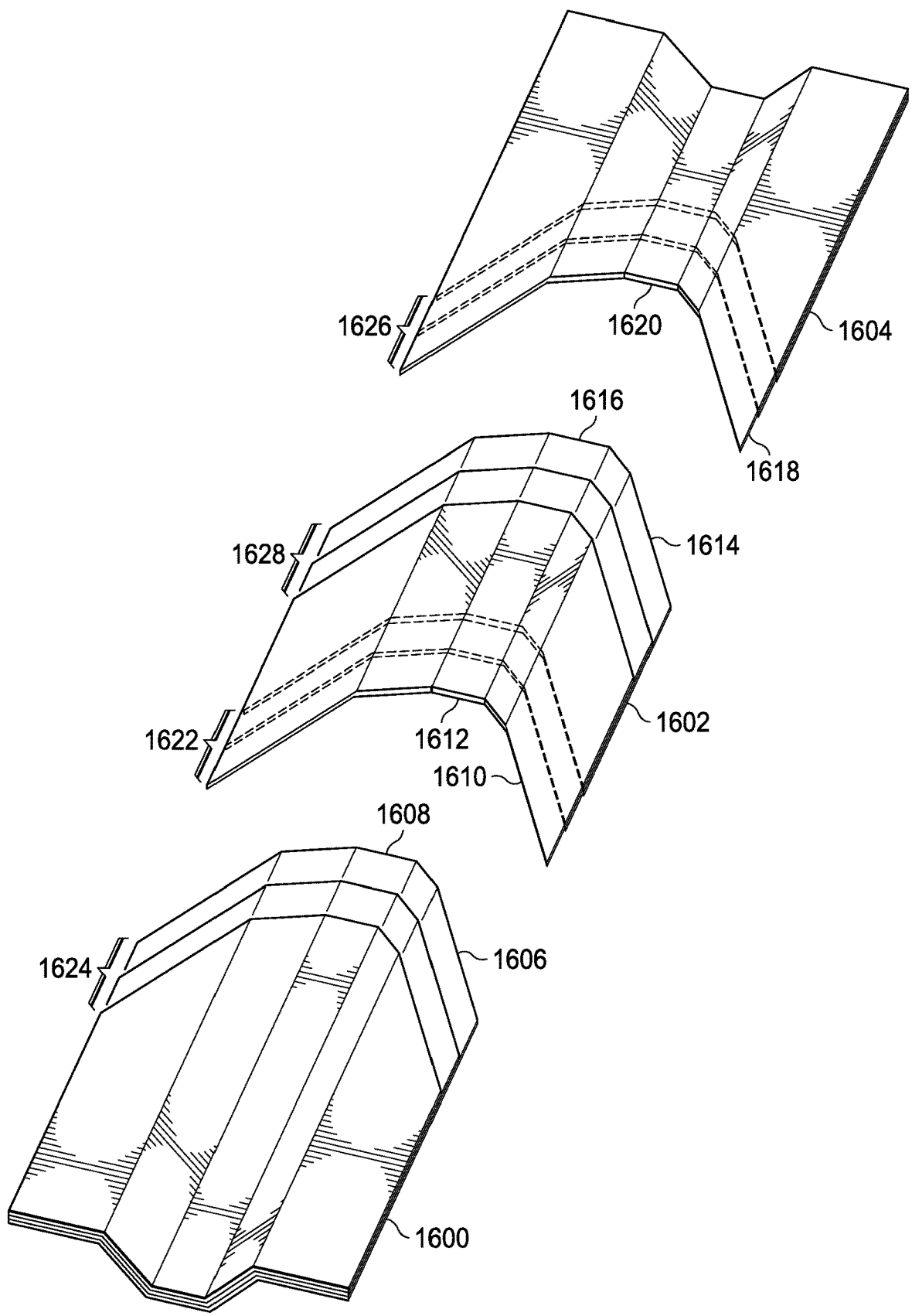
FIG. 16 is an illustration of multiple sections for a composite structure in accordance with an illustrative embodiment.

With reference to FIG. 16, an illustration of multiple sections for a composite structure is depicted in accordance with an illustrative embodiment. As depicted, section 1600, section 1602, and section 1604 are configured to be joined to form a composite structure such, as a stringer.

In this illustrative example, section 1600 has chevrons 1606 at end 1608. Section 1602 has counterparts 1610 to chevrons 1606 at end 1612. Section 1602 also has chevrons 1614 and end 1616. Section 1604 has counterparts 1618 to chevrons 1614 at end 1620. In this example, section 1600 is laid on a tool (not shown) first. Section 1602 is then laid on the tool (not shown) such that steps 1622 in counterparts 1610 overlay steps 1624 in chevrons 1606. Next, section 1604 is laid on the tool such that steps 1626 in counterparts 1618 overlay steps 1628 in chevrons 1614 in section 1602.

Figure 17:
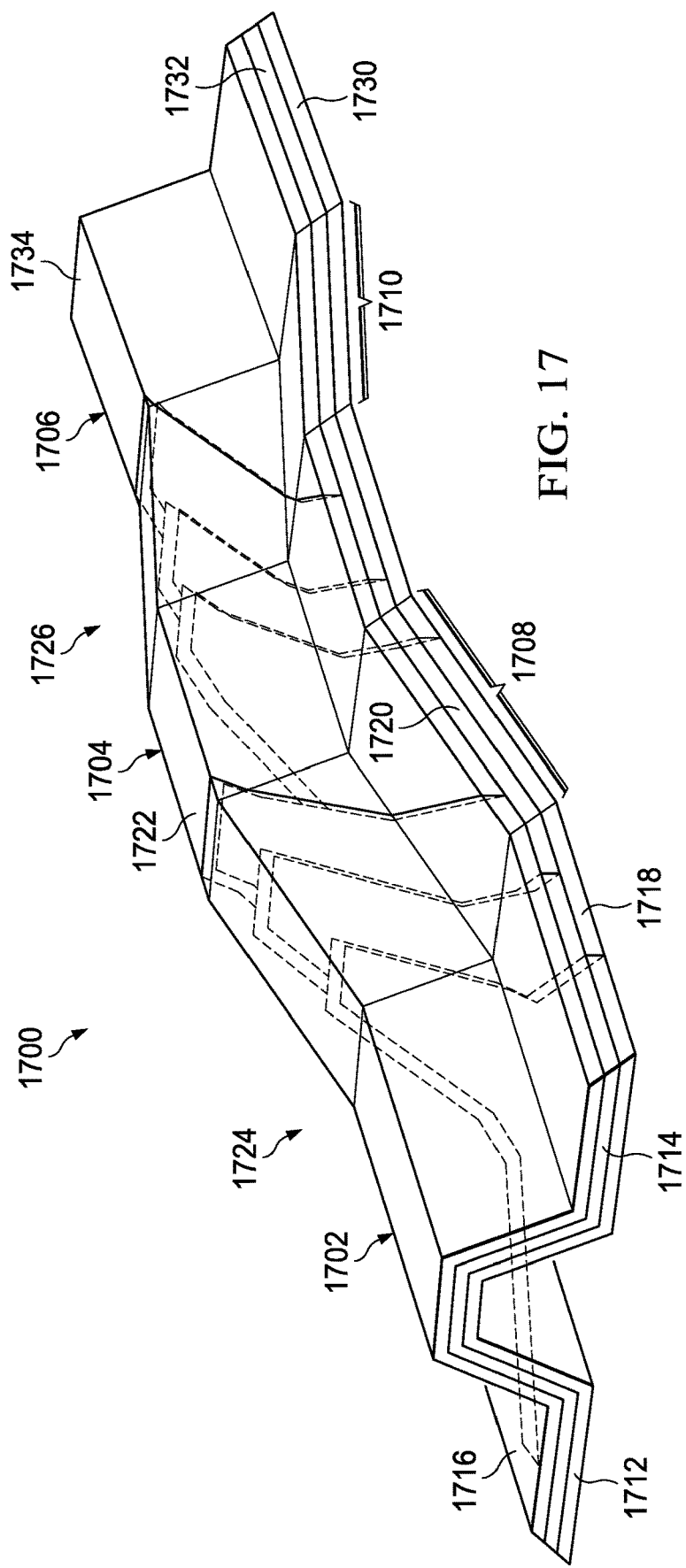
FIG. 17 is an illustration of a stiffener with multiple sections in accordance with an illustrative embodiment.

With reference next to FIG. 17, an illustration of a stiffener with multiple sections is depicted in accordance with an illustrative embodiment. In this illustrative example, stiffener 1700 includes section 1702, section 1704, and section 1706.

In laying up the sections to form stiffener 1700, section 1702 is laid up on a tool followed by section 1704 and section 1706. As depicted, stiffener 1700 includes joggle 1708 and joggle 1710.

Section 1702 has chevron shape (not shown) in layer 1712, layer 1714, and layer 1716. Section 1704 has a counterpart shape (not shown) in layer 1718, layer 1720, and layer 1722 at end 1724. Section 1706 has a counterpart shape (not shown) in layer 1730, layer 1732, and layer 1734 at end 1726.

Figure 18:
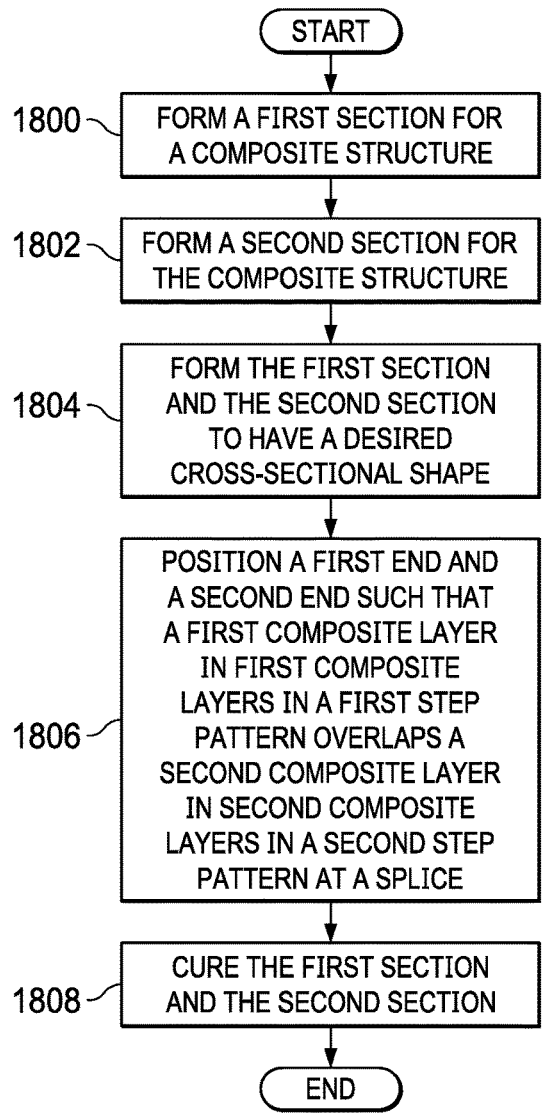
FIG. 18 is an illustration of a flowchart of a process for fabricating a composite structure in accordance with an illustrative embodiment.

Turning next to FIG. 18, an illustration of a flowchart of a process for fabricating a composite structure is depicted in accordance with an illustrative embodiment. The process illustrated in FIG. 1 may be performed to fabricate composite structure 106 in composite manufacturing environment 100.

The process begins by forming first section 108 for composite structure 106 (operation 1800). First section 108 has first end 112 with chevron shape 114. First composite layers 116 in first section 108 has first step pattern 118 at first end 112.

The process forms second section 110 for composite structure 106 (operation 1802). Second section 110 has second end 120 with counterpart shape 122 to chevron shape 114. Second composite layers 124 in second section 110 have second step pattern 126 at second end 120.

The process forms first section 108 and second section 110 to have desired cross-sectional shape 140 (operation 1804). First end 112 and second end 120 are positioned such that first composite layer 128 in first composite layers 116 in first step pattern 118 overlaps second composite layer 130 in second composite layers 124 in second step pattern 126 at splice 134 (operation 1806).

The positioning in operation 1806 may be made by placing first section 108 and second section 110 on a tool. In operation 1806, splice 134 can be wedge splice 147, in which first step pattern 118 has chevron shape 114 and second step pattern 126 has counterpart shape 122. The process cures first section 108 and second section 110 (operation 1808). The process terminates thereafter.

Figure 19:
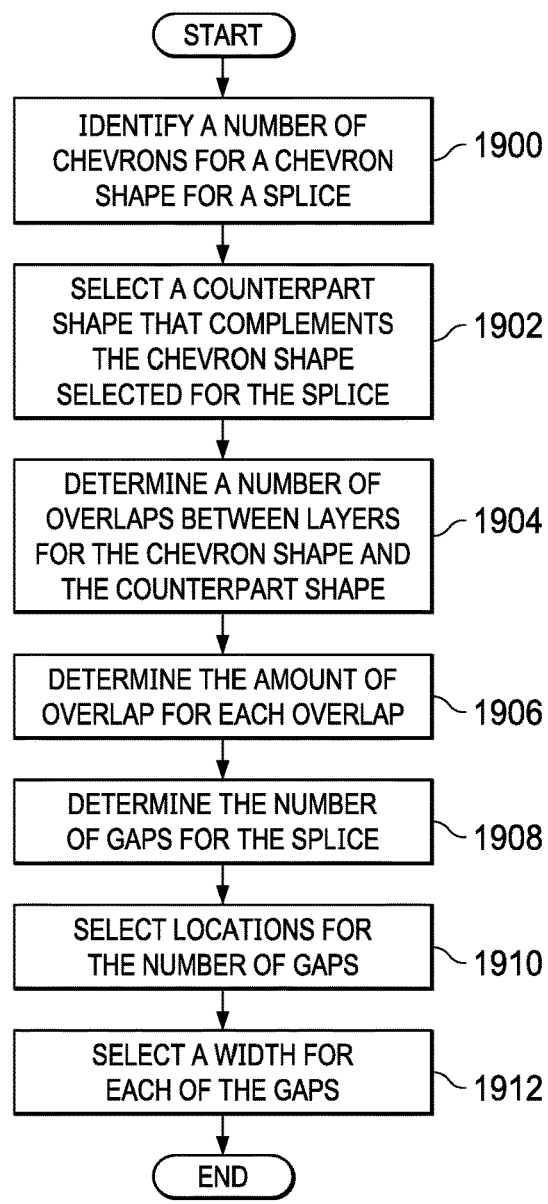
FIG. 19 is an illustration of a flowchart of a process for designing a splice for a composite structure in accordance with an illustrative embodiment.

With reference now to FIG. 19, an illustration of a flowchart of a process for designing a splice for a composite structure is depicted in accordance with an illustrative embodiment. The process illustrated in this flowchart can be used to design composite structure 106 with splice 134 in FIG. 1. This process can be implemented in at least one of hardware or software. When software is present, the software takes the form of program code and is run by a processor unit in a computer system.

The computer system in which the process can be implemented is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, an electronic flight bag, a mobile phone, or some other suitable data processing system.

The process begins by identifying a number of chevrons for a chevron shape for a splice (operation 1900). The selection of the number of chevrons may be based on the number of different considerations. For example, at least one of the amount of curvature or twisting may be taken into account in selecting the number of chevrons for the chevron shape. As at least one of the curvature or twisting of the composite structure increases, the number of chevrons can be increased. The layers in each chevron in a chevron shape do not interact with other layers in another chevron in the chevron shape. As a result, the cross-sectional area of the curve may have less interaction when the number of chevrons increases.

The process selects a counterpart shape that complements the chevron shape selected for the splice (operation 1902). The process determines a number of overlaps between layers for the chevron shape and the counterpart shape (operation 1904). The overlaps can provide increased strength at the splice such that the strength is about the same as if a splice was absent.

The overlapping can be applied to reduce complexity. The number of overlaps and the length of overlaps can be selected to avoid reduction in performance, such as stress or strain.

The process determines the amount of overlap for each overlap (operation 1906). The amount of overlap can also be used to increase the strength of the splice. Additionally, increased overlap can also make manufacturing of the sections and overlaying the sections to form the splice easier to perform. In other words, the increase in overlap can increase manufacturability of a composite part with the splice.

For example, the splice may be designed to have a minimum overlap of about 0.75 inches with a variance of +/−0.25 inches. If the area of the splice is increased by increasing the amount of overlap, the slice may have more variance, such as an overlap of 1.75 inches with a variance of +/−1.0 inches. As a result, the increased overlap in variance can make the splice stronger, as well as increase the ability to correctly layup the layers.

The process then determines the number of gaps for the splice (operation 1908). A gap between a layer in the section with the chevron shape and a layer in the section with the counterpart shape can reduce undesired wrinkling in a composite part, such as a support structure. For example, gaps, such as gap 400 and gap 402 in FIG. 4, can be used to reduce undesired wrinkling. The location at which a gap is present can result in a wrinkle that is small enough that does not result in undesired properties.

The process then selects locations for the number of gaps (operation 1910). The location of a gap can be selected such that the overall number of layers is not greater than desired at the selected location where a gap is present. When more layers are present than desired, the mechanical properties of the layers at the location may be stiffer than desired and may not take as high of a load as desired. For example, the gaps may be placed in locations that reduce compressive loads caused by arc length variations in the composite part occurring through at least one of curvatures or twists in the composite part.

Further, a gap can be placed in a location in the splice when a reduced compressive load is present. For example, a cross-section may alternate between an overlap between layers and a gap between layers. In this manner, the selection of overlaps and gaps in the layers is made to obtain desired performance properties for the composite part. These performance properties may include, for example, at least one of the compressive load, stiffness, strength, or other properties for the composite part at the splice. The process selects a width for each of the gaps (operation 1912). The process terminates thereafter.

In one example, the number of overlaps and gaps are the same as the number of layers. The width of the gaps can be selected based on factors such as, for example, the gap sizes that the laying up for laying the layers can achieve, a desired ratio between thickness of the layers, the width of the gap to cause desired smaller local wrinkling, and other suitable factors.

With reference to FIG. 20, an illustration of a flowchart of a process for forming a step lap splice for a composite structure is depicted in accordance with an illustrative embodiment. The process in FIG. 20 may be performed to form splice 134 in the form of step lap splice 171 for composite structure 106 in composite manufacturing environment 100 in FIG. 1.

The process begins by selecting splice location 132 of step lap splice 171 in composite structure 106 to reduce stress 149 in composite structure 106 (operation 2000). The process forms chevron shape 114 in each layer of first section 108 to create first step lap pattern 181 in first section 108 in which a plurality of chevrons 183 is formed in first section 108 at splice location 132 (operation 2002).

The process then forms counterpart shape 122 in each layer of second section 110 to form second step lap pattern 187 in second section 110 in which a plurality of counterparts 185 is formed in second section 110 at splice location 132 (operation 2004). The layers in first section 108 and second section 110 are composite layers that can be cured. These layers can take the form of layers.

In the illustrative example, the plurality of chevrons 183 and the plurality of counterparts 185 mitigate crack propagation in composite structure 106. The process overlaps each layer with chevron shape 114 with corresponding counterpart shape 141 in second section 110 to form step lap splice 171 (operation 2006). The process terminates thereafter. Overlaps 195 and gaps 193 are present in step lap splice 171. Overlaps 195 and gaps 193 are in locations in step lap splice 171 such that undesired wrinkling 136 in composite structure 106 is reduced. End effector system 191 is utilized to steer at least one of first section 108 and second section 110 to overlap each layer with chevron shape 114 with corresponding counterpart shape 141 in second section 110 to form step lap splice 171. End effector system 191 is a physical system in which one or more end effectors are present. The end effector can be moved by robotic arms or other machines to move and place items, such as first section 108 and second section 110.

With reference now to FIG. 21, an illustration of a flowchart of a process for mitigating crack propagation in a composite structure is depicted in accordance with an illustrative embodiment. The process in FIG. 21 may be performed to form splice 134 in the composite structure 106 in composite manufacturing environment 100 in FIG. 1. The process in FIG. 21 also may be performed to form splice 134 in the form of step lap splice 171 for composite structure 106 in composite manufacturing environment 100 in a manner that mitigates crack propagation in composite structure 106 in FIG. 1.

The process begins by identifying splice location 132 for composite structure 106 to reduce stress 149 in composite structure 106 (operation 2100). In operation 2100 stress 149 is buckling inducing compressive stress. The process forms step lap splice 171 at splice location 132 (operation 2102). The process terminated thereafter.

In operation 2102, step lap splice 171 has chevron shape 114 in each layer of first section 108 that forms first step lap pattern 181 in first section 108 in which a plurality of chevrons 183 is in first section 108. Step lap splice 171 a counterpart shape in each layer of second section 110 that forms second step lap pattern 187 in which a plurality of counterparts 185 is in second section 110. Each layer with the chevron shape overlaps a corresponding counterpart shape for another layer in second section 110 to form step lap splice 171. In operation 2102, splice location 132 reduces at least one of undesired wrinkling 136 or stress 149 in composite structure 106.

Turning to FIG. 22, an illustration of a flowchart of a process for placing splices in a composite structure is depicted in accordance with an illustrative embodiment. The process in FIG. 22 may be performed to form one or more splices, such as splice 134 in composite structure 106 in composite manufacturing environment 100 in FIG. 1.

The process beings by selecting a number of splice locations in composite structure (106) (operation 2200). The process then positions sections for composite structure (106) with step patterns to form number of splices (134) at the number of splice locations (operation 2202). The process terminated thereafter. The process enables reducing undesired wrinkling (136) in at least one of splice location (132) in the number of splice locations or other locations (177) in composite structure (106) other than splice location (132).

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, additional steps may include the placement and removal of release films such as an FEP film. In other illustrative examples, bagging the sections and applying a vacuum may be performed prior to curing the sections to form a composite structure.

Figure 23:
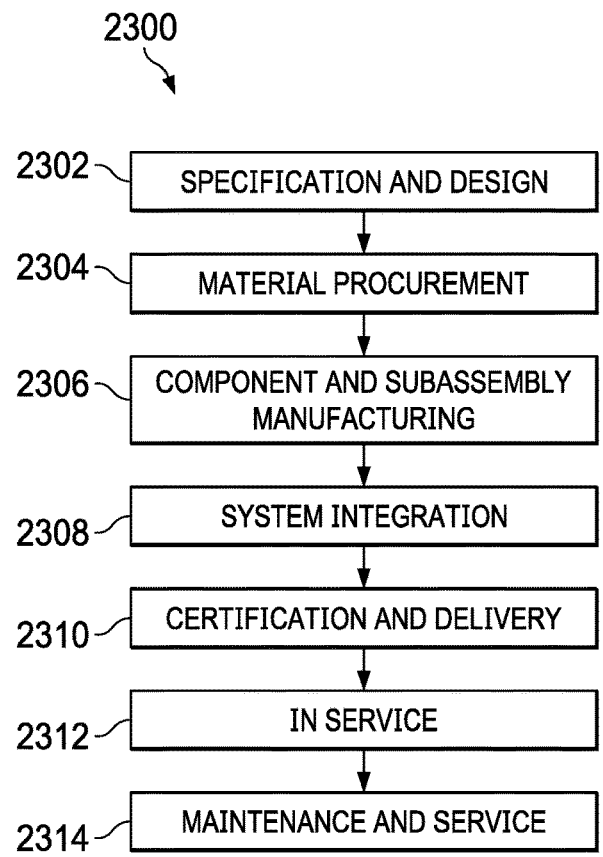
FIG. 23 is an illustration of a block diagram of an aircraft manufacturing and service method in accordance with an illustrative embodiment.
Figure 24:
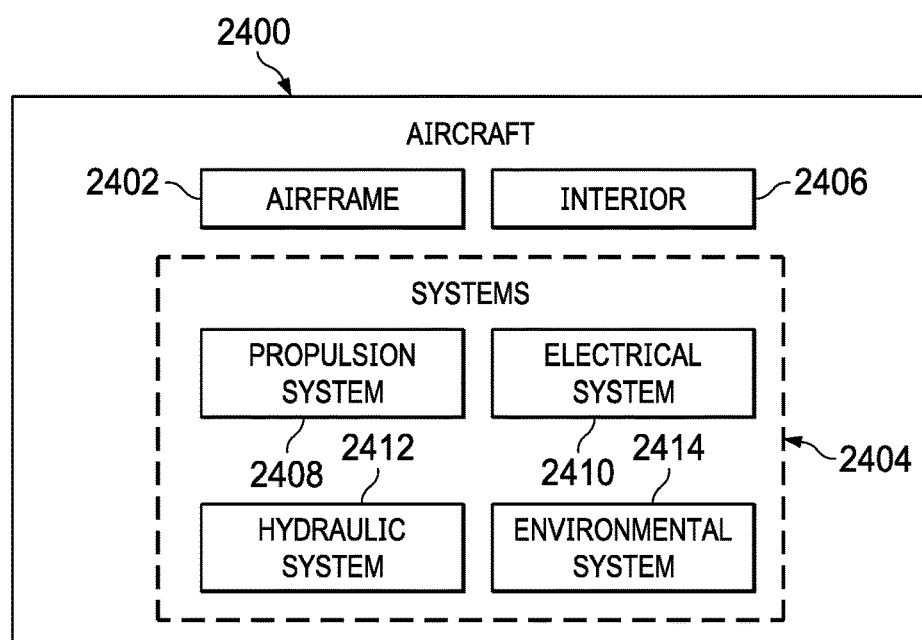
FIG. 24 is an illustration of a block diagram of an aircraft in accordance with an illustrative embodiment.

The illustrative embodiments of the disclosure may be described in the context of aircraft manufacturing and service method 2300 as shown in FIG. 23 and aircraft 2400 as shown in FIG. 24. Turning first to FIG. 23, an illustration of a block diagram of an aircraft manufacturing and service method is depicted in accordance with an illustrative embodiment. During pre-production, aircraft manufacturing and service method 2300 may include specification and design 2302 of aircraft 2400 in FIG. 24 and material procurement 2304.

During production, component and subassembly manufacturing 2306 and system integration 2308 of aircraft 2400 in FIG. 24 takes place. Thereafter, aircraft 2400 may go through certification and delivery 2310 in order to be placed in service 2312. While in service 2312 by a customer, aircraft 2400 is scheduled for routine maintenance and service 2314, which may include modification, reconfiguration, refurbishment, and other maintenance or service.

Each of the processes of aircraft manufacturing and service method 2300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 24, an illustration of a block diagram of an aircraft is depicted in accordance with an illustrative embodiment. In this example, aircraft 2400 is produced by aircraft manufacturing and service method 2300 in FIG. 23 and may include airframe 2402 with plurality of systems 2404 and interior 2406. Examples of systems 2404 include one or more of propulsion system 2408, electrical system 2410, hydraulic system 2412, and environmental system 2414.

Composite components 102, including composite structure 106 in FIG. 1, can be manufactured and implemented in at least one of airframe 2402 and interior 2406. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 2300 in FIG. 23.

In one illustrative example, components or subassemblies produced in component and subassembly manufacturing 2306 in FIG. 23 may be fabricated or manufactured in a manner similar to components or subassemblies produced while aircraft 2400 is in service 2312 in FIG. 23. As yet another example, one or more apparatus embodiments, method embodiments, or a combination thereof may be utilized during production stages, such as component and subassembly manufacturing 2306 and system integration 2308 in FIG. 23. One or more apparatus embodiments, method embodiments, or a combination thereof may be utilized while aircraft 2400 is in service 2312, during maintenance and service 2314 in FIG. 23, or both.

Composite components 102, in accordance with an illustrative example, can be implemented in various stages of aircraft manufacturing and service method 2300. For example, composite components 102, including composite structure 106, in FIG. 1 can be fabricated during component and subassembly manufacturing 2306, system integration 2308, as well as during maintenance and service 2314. Composite components 102 including composite structure 106, can be fabricated for use in routine maintenance, modification, reconfiguration, or refurbishment of aircraft 2400 during maintenance and service 2314.

The use of a number of the different illustrative embodiments may substantially expedite the assembly of aircraft 2400, reduce the cost of aircraft 2400, or both expedite the assembly of aircraft 2400 and reduce the cost of aircraft 2400.

Thus, the illustrative embodiments provide a method, an apparatus, and a system for fabricating a composite structure having a splice that is designed to reduce undesired consistencies such as wrinkling. In one illustrative example, a method for fabricating a composite structure comprises forming a first section for the composite structure in which the first section has a first end with a chevron shape, wherein first composite layers in the first section have a first step pattern at a first end. A second section is formed for the composite structure in which the second section has a second end with a counterpart shape to the chevron shape, and in which second composite layers in the second section have a second step pattern at the second end. The first end and the second end are positioned such that a first composite layer in the first composite layers in the first step pattern overlaps a second composite layer in the second composite layers in the second step pattern at a splice location.

With one or more illustrative examples, the amount of labor and time needed to fabricate composite structures may be reduced. In the illustrative example, the use of wedge shapes and counterpart shapes in step patterns can be employed in splicing two sections together in a manner that provides design isolation between regions of the composite structure.

In the illustrative examples, with thicker composite structures, the overall length of the splice due to overlap and gap tolerances can be large relative to a feature that drives arc length variation. As depicted in the examples, the chevron-shaped splice joint can be used to mitigate arc length variation area of the splice joint.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a step lap splice for a composite structure, the method comprising:
   forming a chevron shape in each layer of a first section to create a first step lap pattern in the first section in which a plurality of chevrons is formed in the first section;

forming a counterpart shape in each layer of a second section to create a second step lap pattern in the second section in which a plurality of counterparts is formed in the second section; and overlapping each layer with the chevron shape with a corresponding counterpart shape in the second section to form the step lap splice.

2. The method of claim 1, wherein locations of overlaps and gaps in the step lap splice in the composite structure reduces undesired wrinkling in the composite structure.

3. The method of claim 1, wherein the step lap splice is placed in a number of locations in the composite structure, wherein the number of locations is selected to reduce undesired wrinkling in the composite structure.

4. The method of claim 1, wherein robotic arms are utilized to steer at least one of the first section and the second section to overlap each layer with the chevron shape with the corresponding counterpart shape in the second section to form the step lap splice.

5. The method of claim 1, wherein the plurality of chevrons and the plurality of counterparts mitigate crack propagation in at least one of the composite structure or the step lap splice.

6. The method of claim 1 further comprising:
selecting a splice location for the step lap splice in the composite structure to reduce buckling inducing compressive stress in the composite structure.

7. A portion of an aircraft assembled according to the method of claim 1.

8. A method for mitigating crack propagation in a composite structure, the method comprising:
identifying a splice location for the composite structure to reduce stress in the composite structure; and
forming a step lap splice at the splice location in which the step lap splice has a chevron shape in each layer of a first section that forms a first step lap pattern in the first section in which a plurality of chevrons is in the first section; in which the step lap splice has a counterpart shape in each layer of a second section that forms a second step lap pattern in the second section in which a plurality of counterparts is in the second section; and in which each layer with the chevron shape overlaps a corresponding counterpart shape for another layer in the second section to form the step lap splice.

9. The method of claim 8, wherein forming the step lap splice at the splice location reduces at least one of undesired wrinkling or stress in the composite structure at the splice location.

10. A portion of an aircraft assembled according to the method of claim 8.

11. A method for fabricating a composite structure, the method comprising:
forming a first section for the composite structure in which the first section has a first end with a chevron shape, wherein first composite layers in the first section has a first step pattern at the first end;
forming a second section for the composite structure in which the second section has a second end with a counterpart shape to the chevron shape and in which second composite layers in the second section have a second step pattern at the second end; and
positioning the first end and the second end such that the first composite layers in the first step pattern overlap the second composite layers in the second step pattern at a splice location.

12. The method of claim 11, wherein undesired wrinkling for the composite structure is reduced at and around the splice location.

13. The method of claim 11, wherein the composite structure is a stringer, and wherein the first section and the second section are substantially planar and further comprising:
forming the first section and the second section into a cross-sectional shape created by a tool having an upper die and lower die.

14. The method of claim 13, wherein the cross-sectional shape is a hat shape, a U-shape, or a C-shape.

15. The method of claim 11 further comprising:
placing the first section and the second section on a tool for the composite structure; and
curing the first section and the second section to form the composite structure.

16. The method of claim 11, wherein the chevron shape comprises a group of chevrons.

17. The method of claim 11, wherein positioning the first end and the second end such that the first composite layers in the first step pattern overlap the second composite layers in the second step pattern at the splice location comprises:
positioning the first end and the second end such that the first composite layers in the first step pattern overlap the second composite layers in the second step pattern at the splice location, wherein at least one of a gap or an overlap is present between the first composite layers and the second composite layers such that stress is reduced at the splice location.

18. The method of claim 11, wherein the composite structure is a stringer and further comprises:
attaching the stringer to a composite barrel section of a fuselage for an aircraft.

19. The method of claim 11, wherein positioning the first end and the second end such that the first composite layers in the first step pattern overlap the second composite layers in the second step pattern at the splice location comprises:
positioning the first end and the second end such that the first composite layers in the first step pattern overlap the second composite layers in the second step pattern to form a wedge splice at the splice location.

20. The method of claim 11, wherein the first composite layers are a first prepreg structure and the second composite layers are a second prepreg structure.

21. The method of claim 11, wherein the composite structure is selected from the group consisting of a stiffener, a stringer, a longeron, and a beam.

22. A portion of an aircraft assembled according to the method of claim 11.

23. A method for fabricating a composite structure, the method comprising:
forming a first section for the composite structure in which the first section has a first end with a chevron shape in which first composite layers in the first section have a first step pattern at the first end, and in which the chevron shape comprises a group of chevrons;
forming a second section for the composite structure in which the second section has a second end with a counterpart shape to the chevron shape, and in which second composite layers in the second section have a second step pattern at the second end in which the first section and the second section are substantially planar;
forming the first section and the second section into a cross-sectional shape created by a tool having an upper die and lower die;

positioning the first end and the second end on a tool such that the first composite layers in the first step pattern overlap the second composite layers in the second step pattern at a splice location to form a lap splice joint in which at least one of a gap or an overlap is present between the first composite layers and the second composite layers such that stress is reduced at the lap splice joint and undesired wrinkling for the composite structure is reduced at the splice location; and curing the first section and the second section to form the composite structure.

24. A portion of an aircraft assembled according to the method of claim 23.

25. A method of placing splices in a composite structure, the method comprising:

selecting a number of splice locations in the composite structure; and positioning sections for the composite structure with step patterns to form a number of splices at the number of splice locations, in which undesired wrinkling is reduced in at least one of a splice location in the number of splice locations or other locations in the composite structure other than the splice location, wherein a first section in the sections for a first splice has a first step pattern with chevron shapes at a splice location in the number of splice locations and a second section in the sections for the first splice has a second step pattern with a counterpart shape in the splice location in the number of splice locations.

26. The method of claim 25, wherein the composite structure is a stringer, and wherein the first section and the second section are substantially planar and further comprises:

forming the first section and the second section into a cross-sectional shape created by a tool having an upper die and lower die.

27. The method of claim 26, wherein the cross-sectional shape is selected from a group consisting of a hat shape, a U-shape, and a C-shape.

28. The method of claim 25 further comprising:

curing the sections positioned to form the number of splices to form the composite structure.

29. The method of claim 25, wherein the composite structure is selected from the group consisted of a stiffener, a stringer, and a longeron.

30. The method of claim 25, wherein the chevron shapes and the counterpart shapes mitigate crack propagation in the composite structure.

31. A composite structure comprising:

a first step lap pattern formed by a plurality of chevrons in a first section of the composite structure; and a second step lap pattern formed by a plurality of chevrons in a second section of the composite structure, wherein the first step lap pattern and the second step lap pattern overlap each other to form a step lap splice.

32. The composite structure of claim 31, wherein the step lap splice reduces stress in the composite structure.

33. The composite structure of claim 31, wherein the step lap splice has less undesired wrinkling in at least one of in the step lap splice or in locations outside of the step lap splice.

34. The composite structure of claim 31, wherein overlaps and gaps are present in the step lap splice in the composite structure such that undesired wrinkling is reduced in the composite structure.

35. An aircraft using the composite structure of claim 31.

36. A composite structure comprising:

a first section for the composite structure in which the first section has a first end with a chevron shape and in which first composite layers in the first section have a first step pattern at the first end; and a second section for the composite structure in which the second section has a second end with a counterpart shape to the chevron shape; a second plurality of composite layers in the second section has a second step pattern at the second end; and the first end and the second end are positioned such that the first composite layers in the first step pattern overlap second composite layers in the second step pattern at a splice location.

37. The composite structure of claim 36, wherein undesired wrinkling for the composite structure is reduced at the splice location.

38. The composite structure of claim 36, wherein undesired wrinkling is reduced in at least one of a splice in the splice location or in locations in the composite structure other than the splice location.

39. The composite structure of claim 36, wherein the composite structure is a stringer, and wherein the first section and the second section have a desired cross-sectional shape.

40. The composite structure of claim 39, wherein the desired cross-sectional shape is selected from a group comprising a hat shape, a U-shape, and a C-shape.

41. The composite structure of claim 36, wherein the first section and the second section are cured on a tool to form the composite structure.

42. The composite structure of claim 36, wherein the chevron shape comprises a group of chevrons.

43. The composite structure of claim 36, wherein the composite structure is a stringer configured to be attached to a composite barrel section of a fuselage for an aircraft.

44. The composite structure of claim 36, wherein the first end and the second end are positioned such that the first composite layers in the first step pattern overlap the second composite layers in the second step pattern at the splice location, wherein at least one of a gap or an overlap is present between the first composite layers and the second composite layers such that stress is reduced at the splice location.

45. The composite structure of claim 36, wherein the first end and the second end are positioned such that the first composite layers in the first step pattern overlap the second composite layers in the second step pattern to form a lap splice joint at the splice location.

46. The composite structure of claim 36, wherein the first composite layers are a first prepreg structure, and the second composite layers are a second prepreg structure.

47. The composite structure of claim 36, wherein the composite structure is selected from one of a stiffener, a stringer, and a longeron.

48. A composite structure comprising:

a first section for the composite structure in which the first section has a first end with a chevron shape comprised of a group of chevrons and in which first composite layers in the first section have a first step pattern at the first end; and a second section for the composite structure in which the second section has a second end with a counterpart shape to the chevron shape in which the first section and the second section have a desired cross-sectional shape and in which a second plurality of composite layers in the second section has a second step pattern at the second end; and the first end and the second end are positioned such that the first composite layers in the first step pattern overlap the second composite layers in the second step pattern at a splice location in which at least one of a gap or an overlap is present between the first composite layers and the second composite layers for a lap splice joint such that stress is reduced at the splice location and in which undesired wrinkling for the composite structure is reduced at the splice location.

49. An aircraft using the composite structure of claim 48.

\* \* \* \* \*